Figure 47:
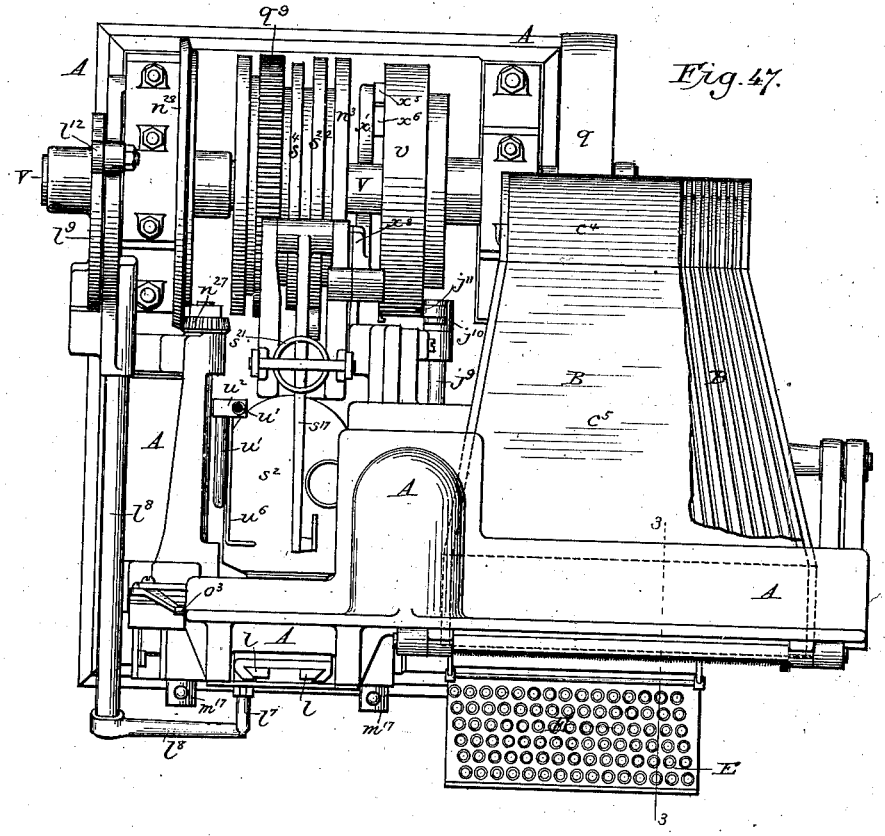

(No Model.)
O. MERGENTHALER.
MACHINE FOR FORMING TYPE BARS.
No. 436,531. Patented Sept. 16, 1890.
12 Sheets—Sheet 1.
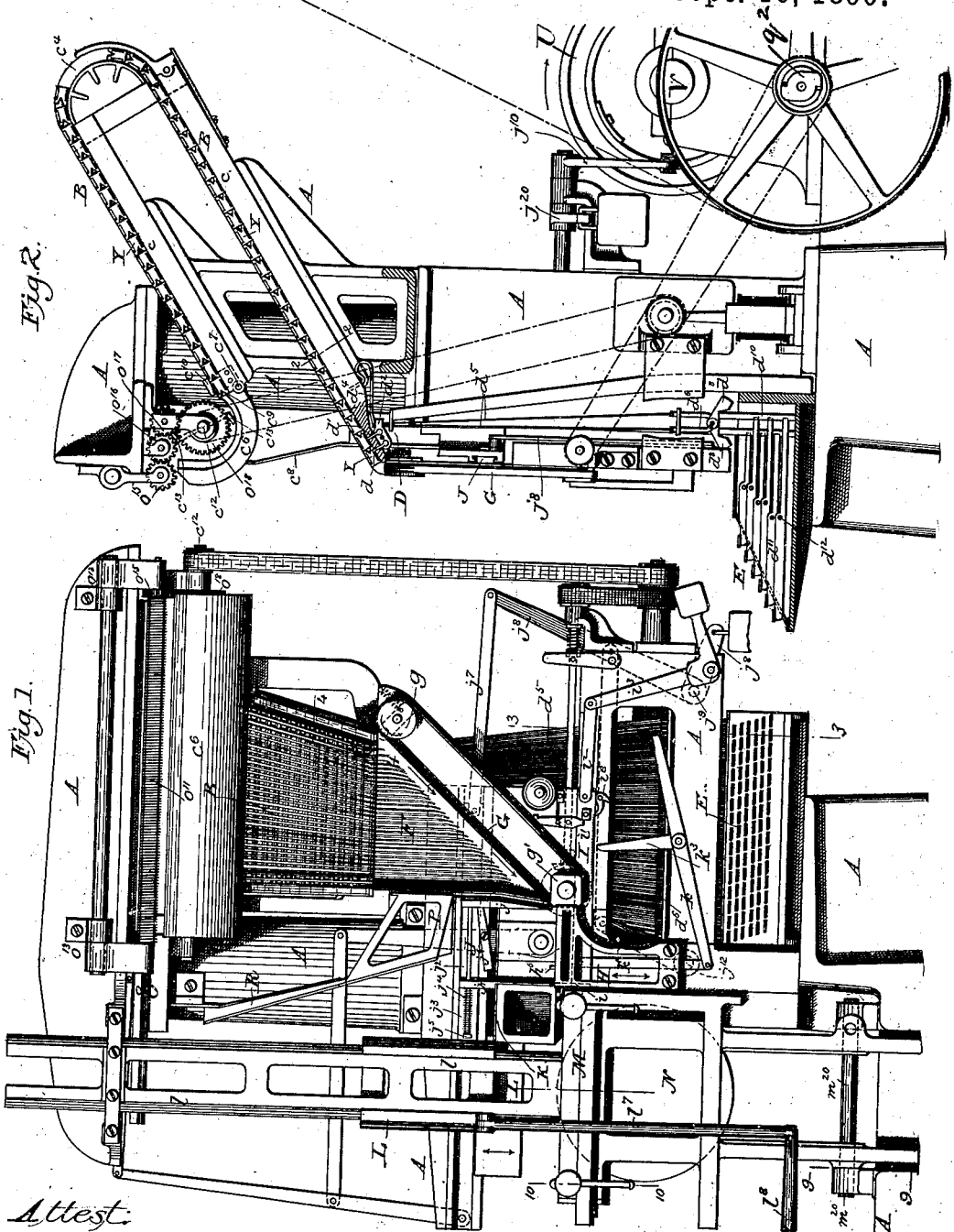
Attest:
N. G. Kennedy
F. Pauly Elmore
Inventor:
Ottmar Mergenthaler
By Phil. T. Dodge, Atty

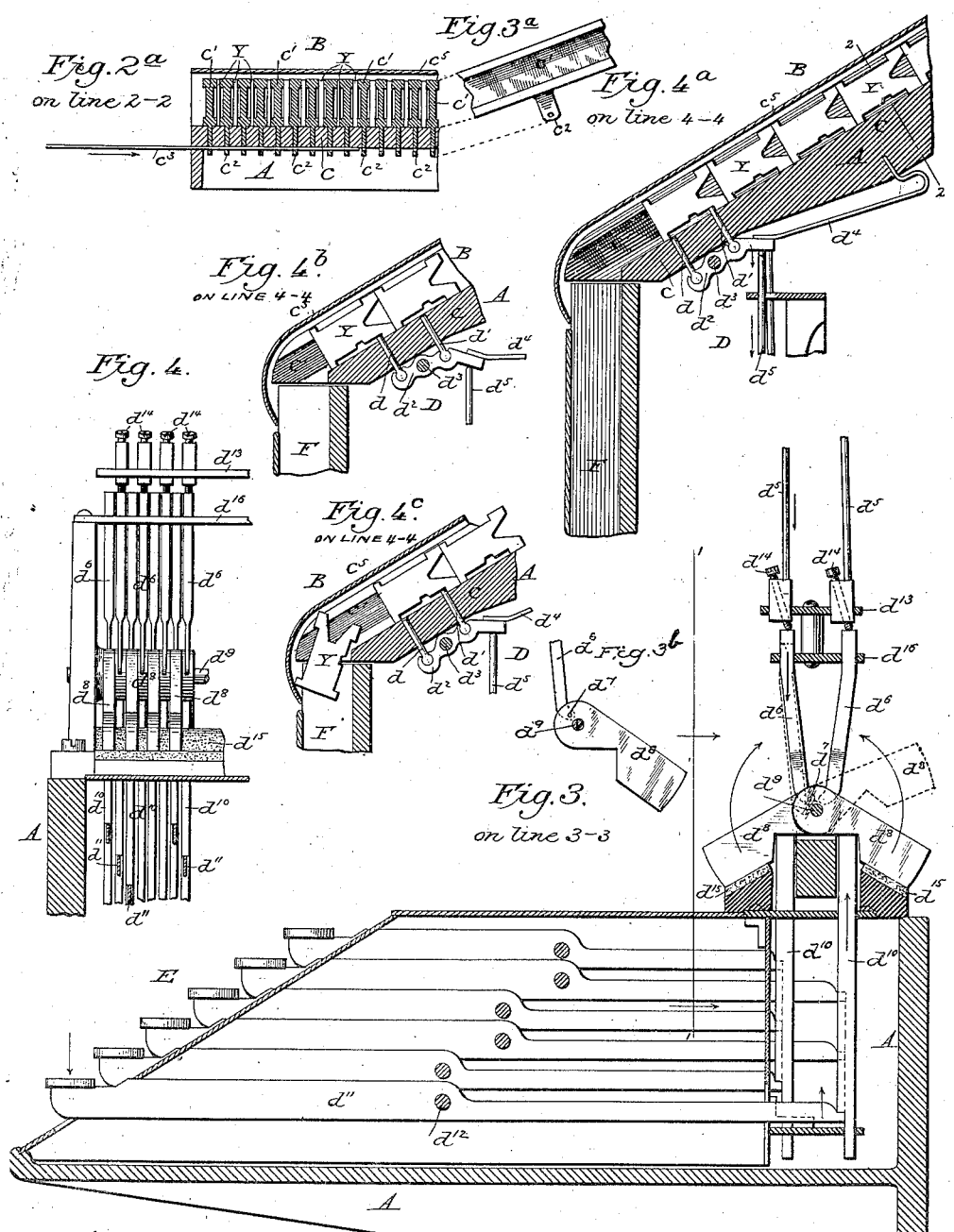

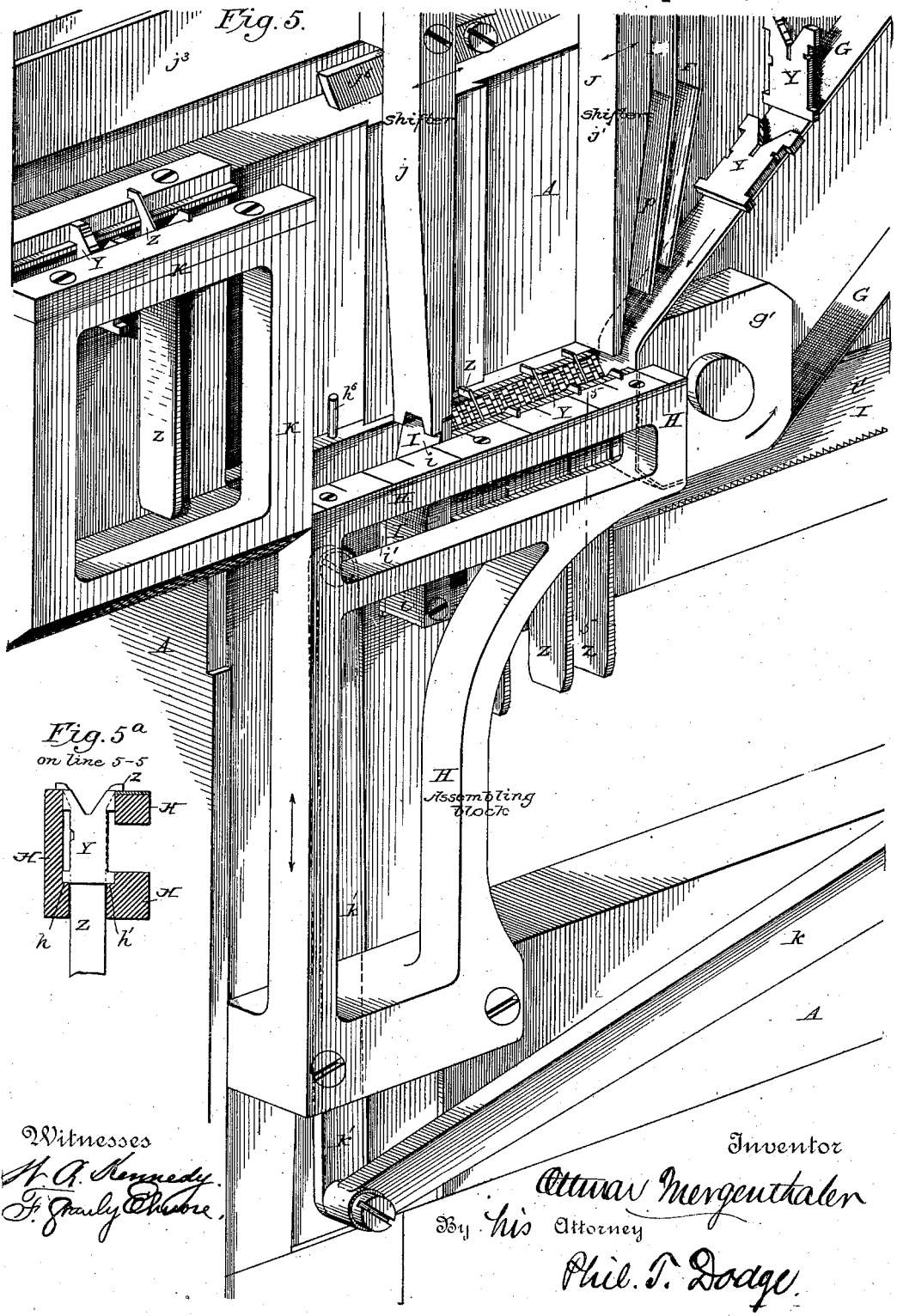

(No Model.) 12 Sheets—Sheet 4.
O. MERGENTHALER.
MACHINE FOR FORMING TYPE BARS.
No. 436,531. Patented Sept. 16, 1890.
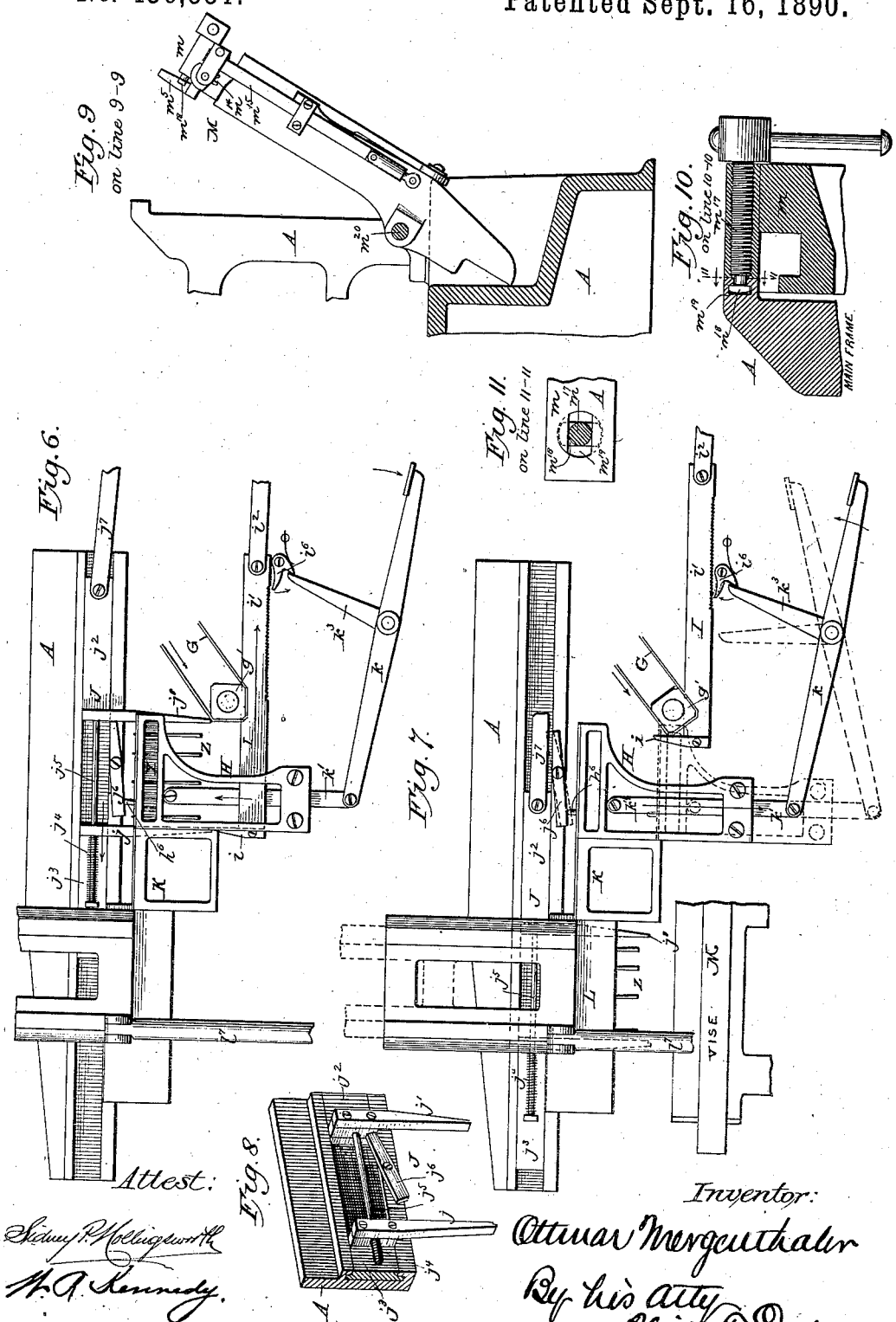

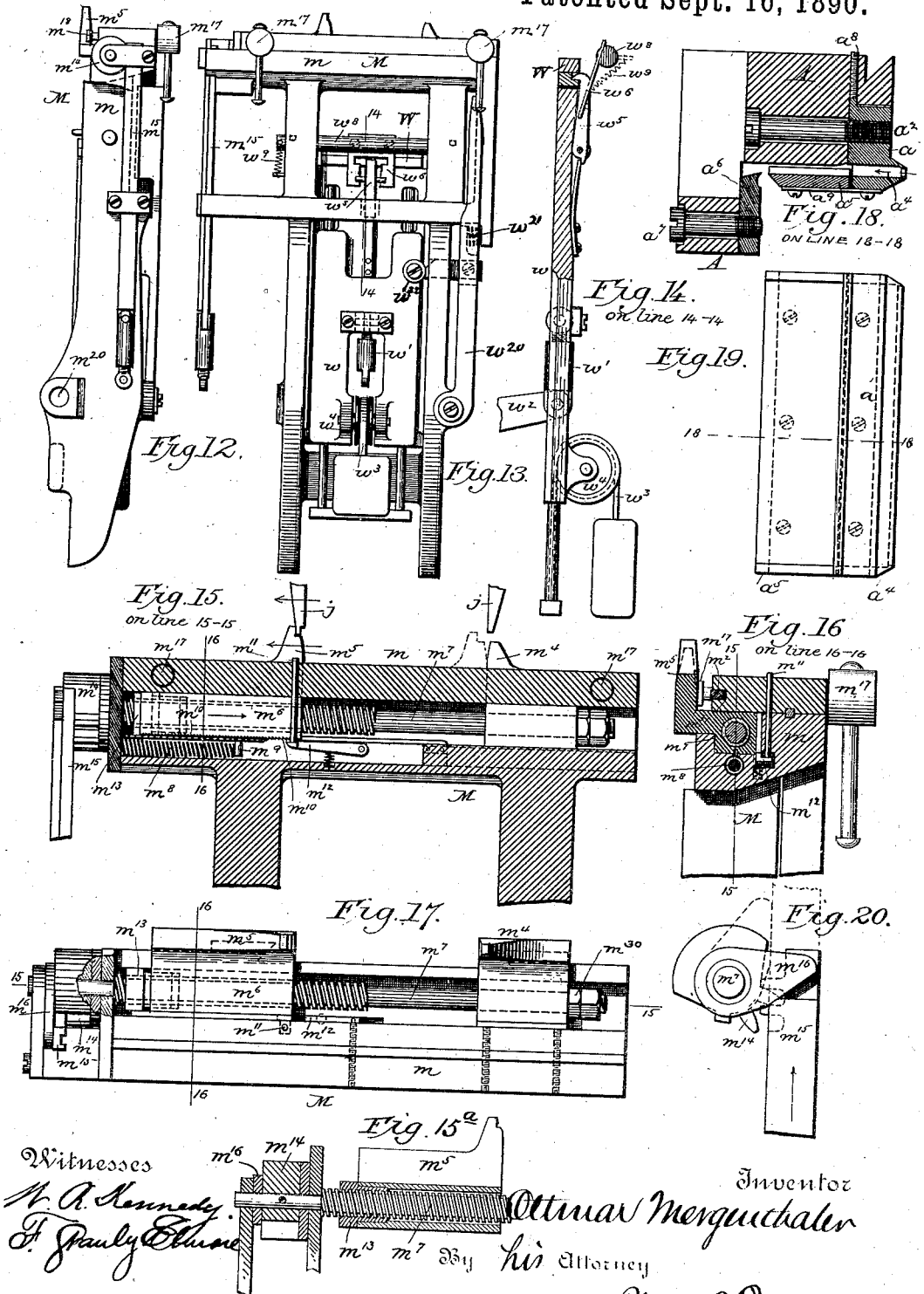

(No Model.)
O. MERGENTHALER.
MACHINE FOR FORMING TYPE BARS.
No. 436,531. Patented Sept. 16, 1890.
12 Sheets—Sheet 6.
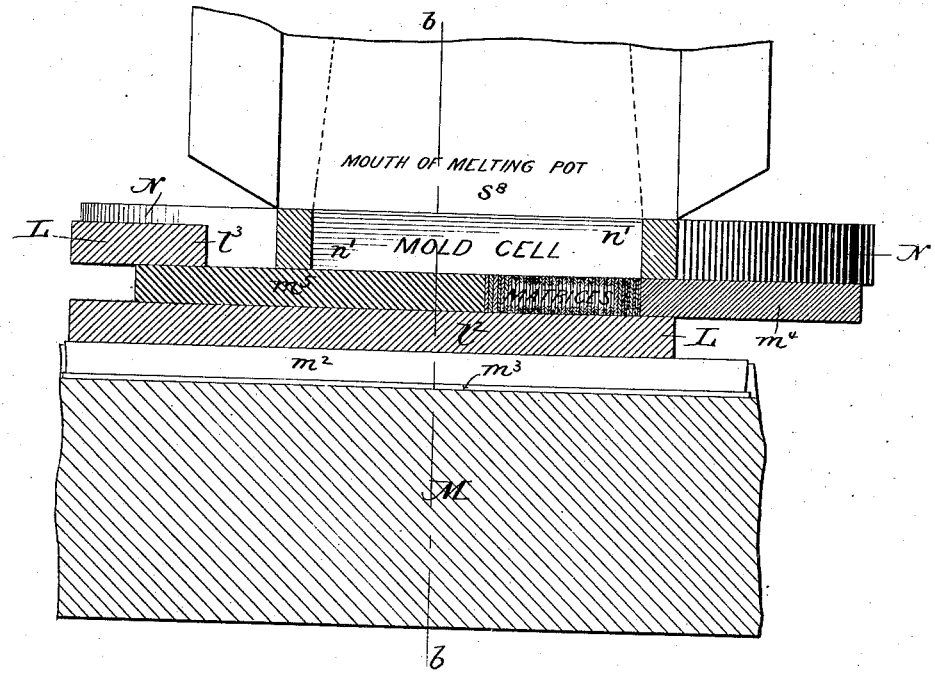
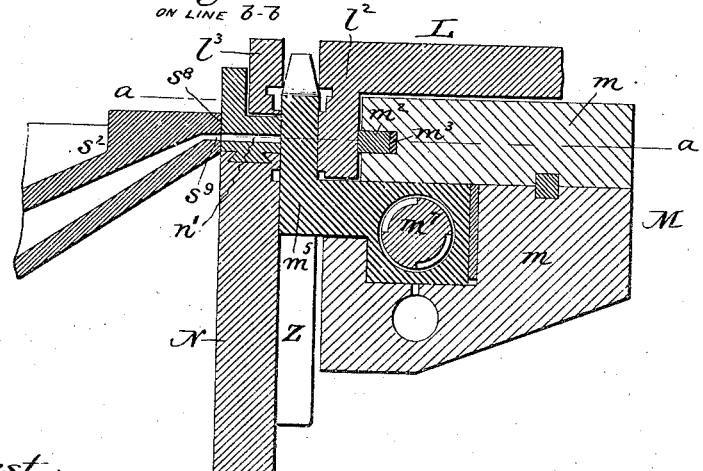

(No Model.) 12 Sheets—Sheet 7.
O. MERGENTHALER.
MACHINE FOR FORMING TYPE BARS.
No. 436,531. Patented Sept. 16, 1890.
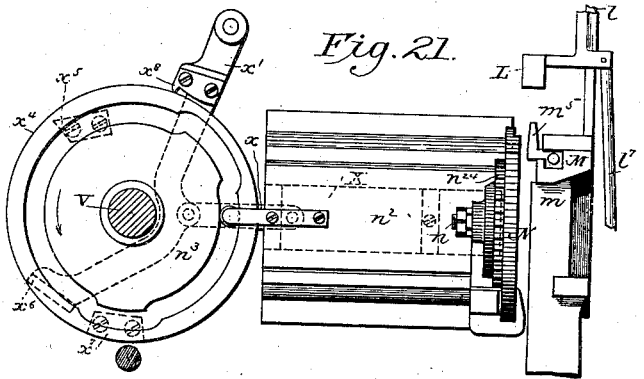
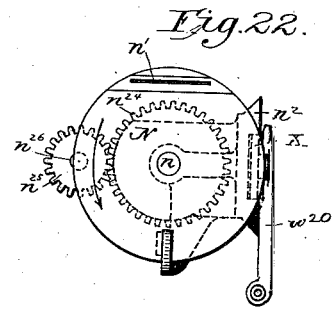
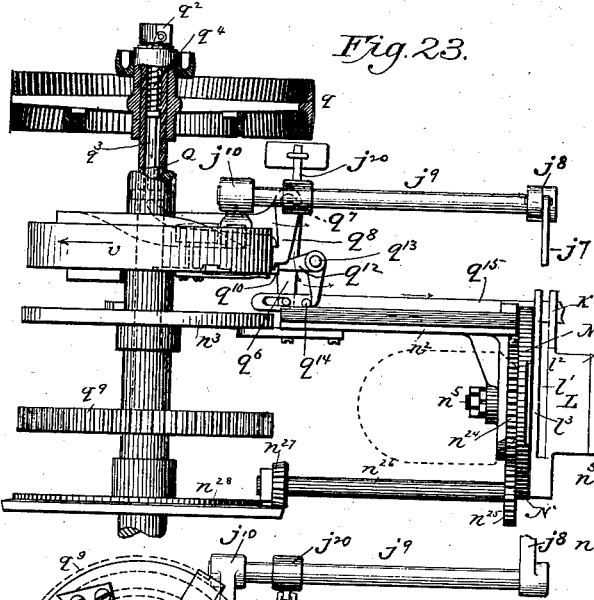
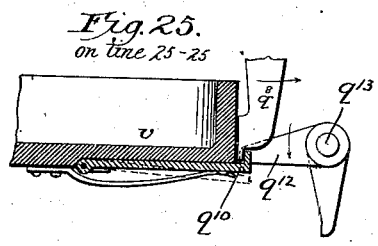
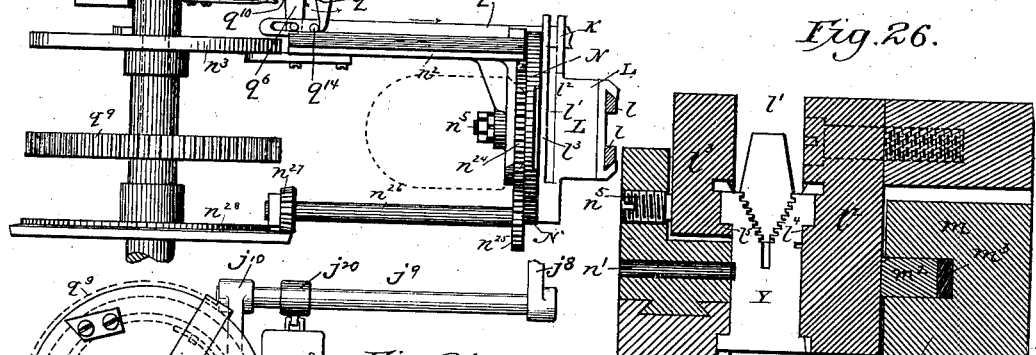
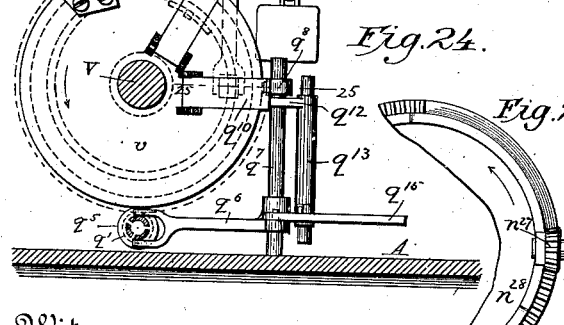
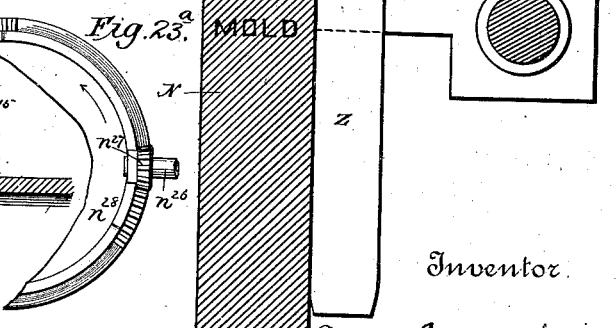
Witnesses
H. A. Kennedy
F. Danly Elmore
Inventor
Ottmar Mergenthaler
By his Attorney
Phil. T. Dodge

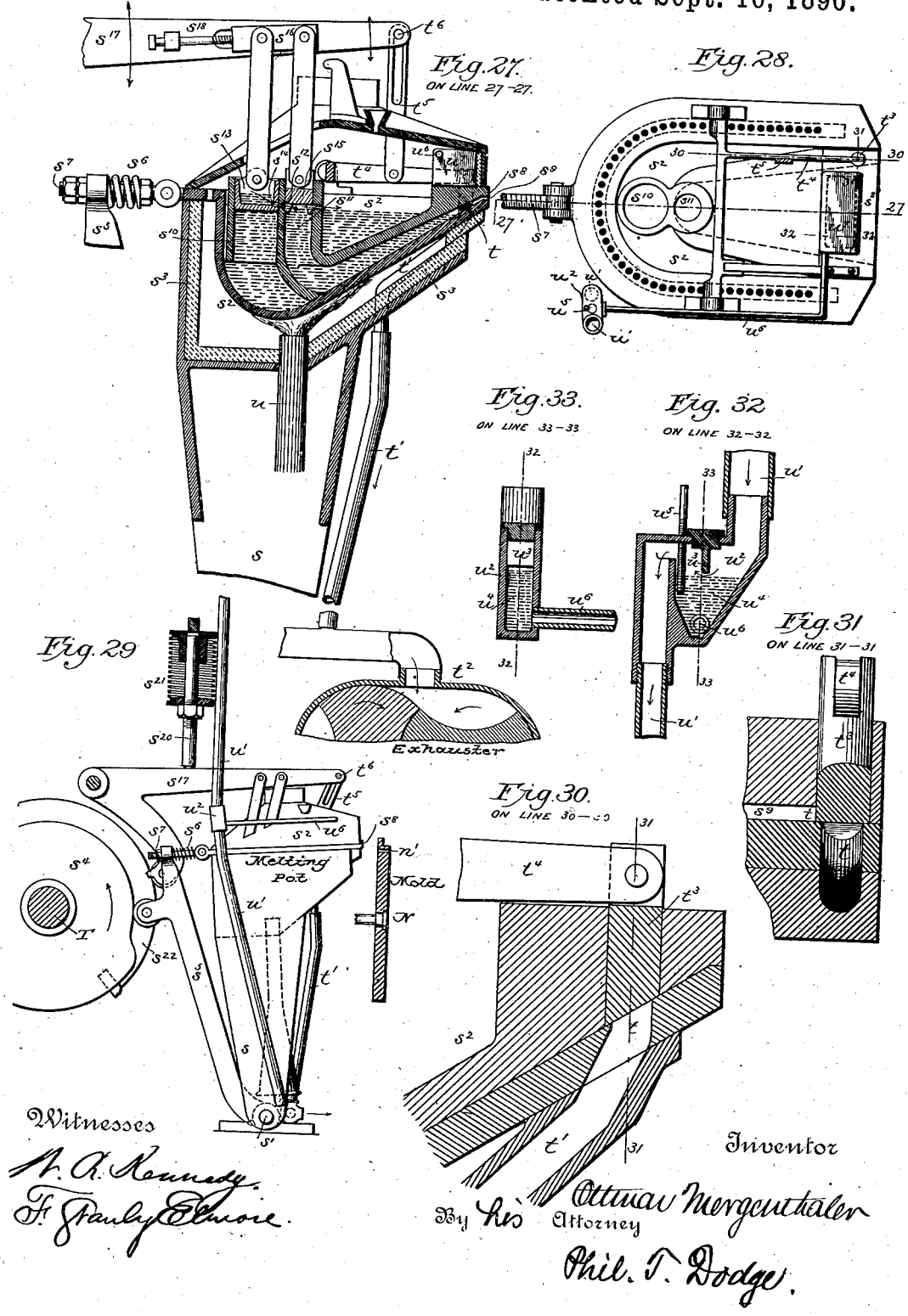

(No Model.)
O. MERGENTHALER.
MACHINE FOR FORMING TYPE BARS.
No. 436,531.   Patented Sept. 16, 1890.
12 Sheets—Sheet 9.
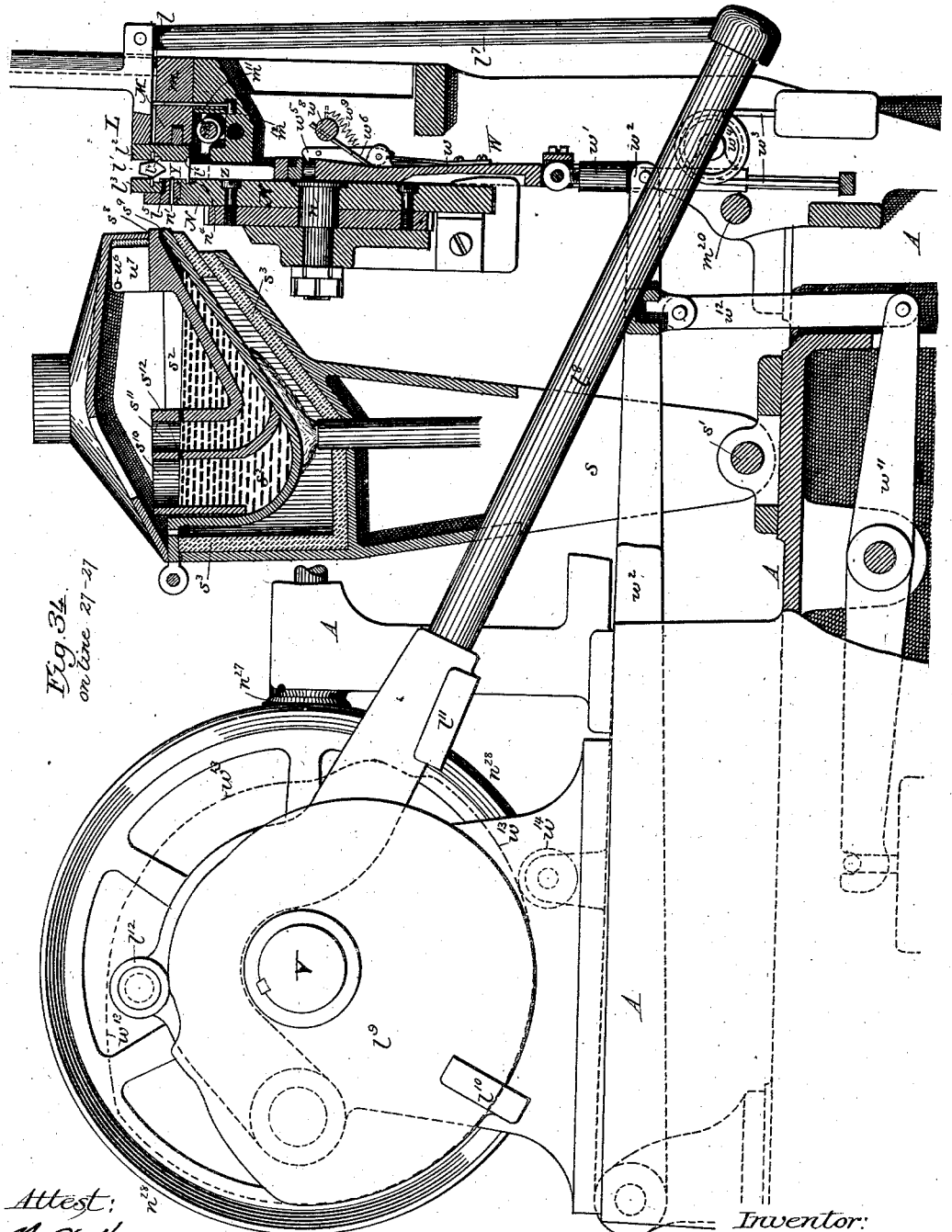

(No Model.) 12 Sheets—Sheet 10.
O. MERGENTHALER.
MACHINE FOR FORMING TYPE BARS.
No. 436,531. Patented Sept. 16, 1890.
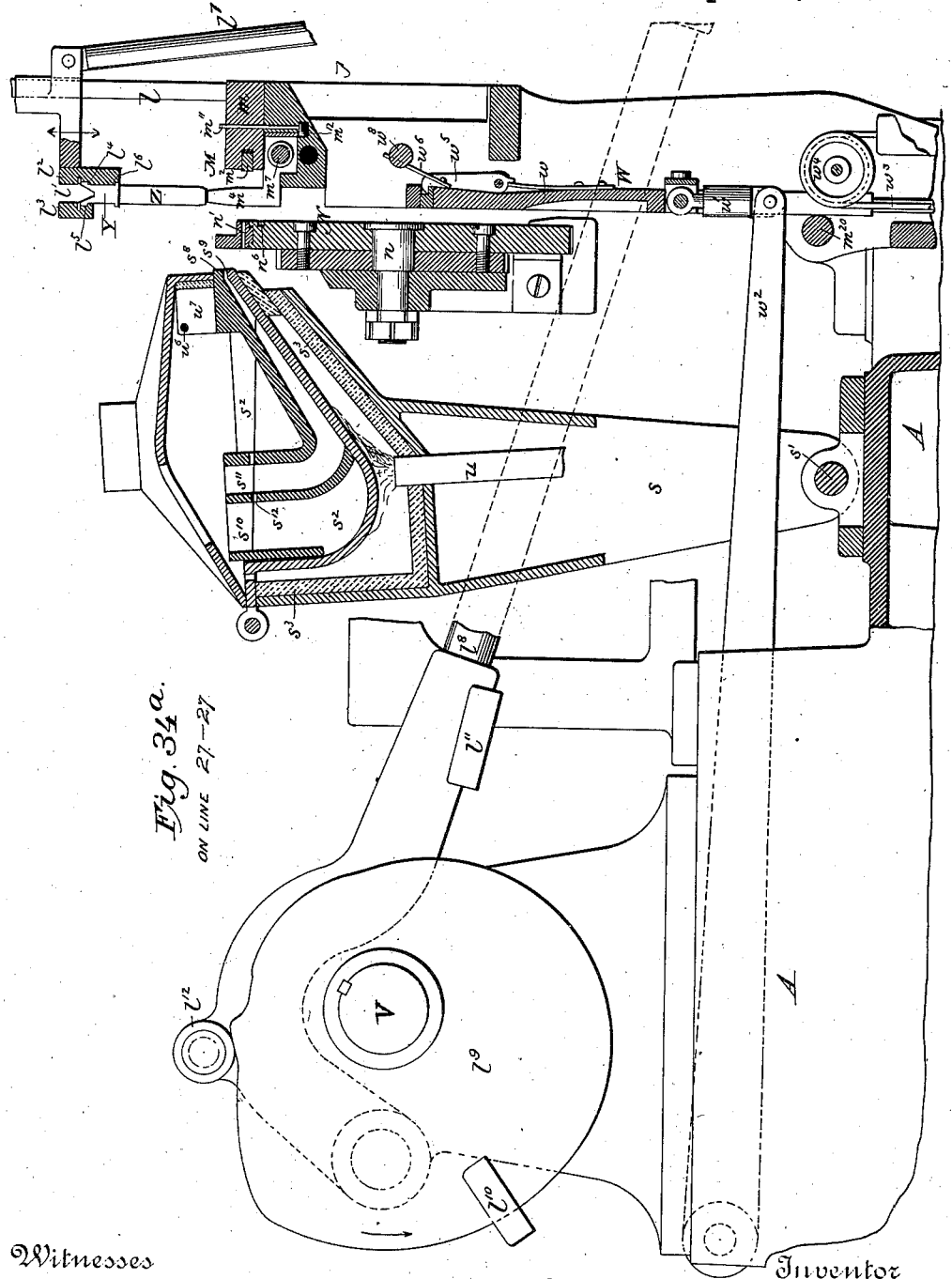
Fig. 34ª.
ON LINE 27-27
Witnesses
Sidney P. Hollingworth
N. R. Kennedy.
Inventor
Ottmar Mergenthaler
By Phil. T. Dodge.
Attorney

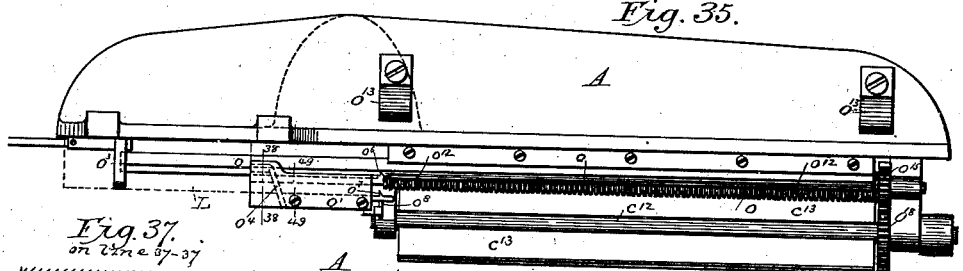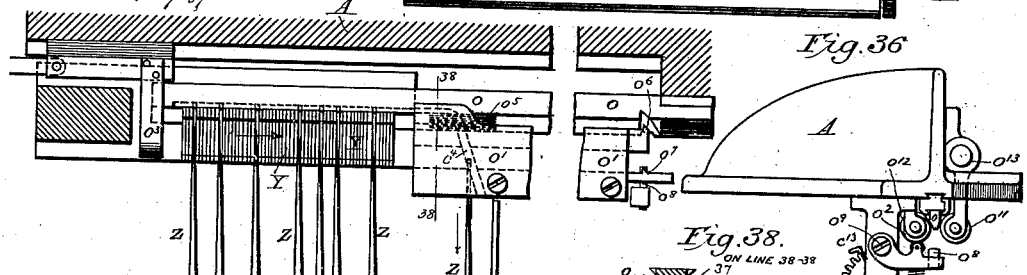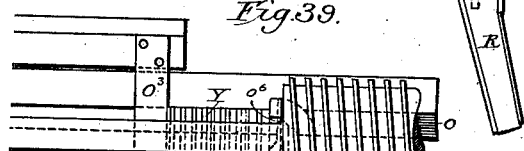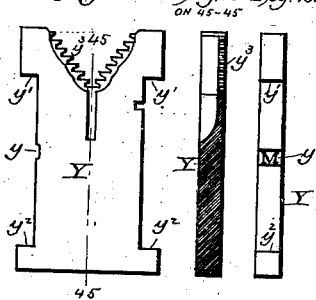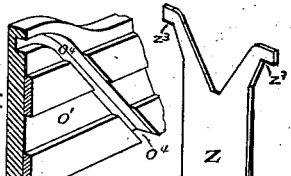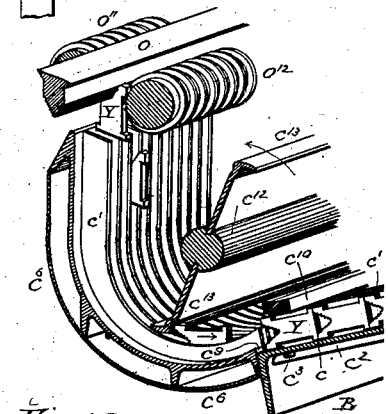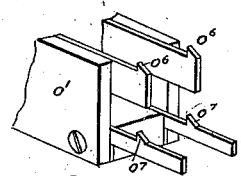

(No Model.)

O. MERGENTHALER.
MACHINE FOR FORMING TYPE BARS.

No. 436,531. Patented Sept. 16, 1890.

on line 48-48 on line 49-49

Witnesses
H. A. Kennedy
F. Franly Elmore

Inventor
Ottmar Mergenthaler
By his Attorney
Phil. T. Dodge

UNITED STATES PATENT OFFICE.

OTTMAR MERGENTHALER, OF BALTIMORE, MARYLAND, ASSIGNOR TO THE NATIONAL TYPOGRAPHIC COMPANY, OF WEST VIRGINIA.

MACHINE FOR FORMING TYPE-BARS.

SPECIFICATION forming part of Letters Patent No. 436,531, dated September 16, 1890.

Application filed March 15, 1889. Serial No. 303,396. (No model.)

*To all whom it may concern:*

Be it known that I, OTTMAR MERGENTHALER, of Baltimore, in the State of Maryland, have invented certain Improvements in Machines for Forming Type-Bars, of which the following is a specification.

This invention relates to what are now known in the art as "linotype-machines," designed to produce printing-forms composed of linotypes—that is to say, line bars or type, each bearing on its face properly justified the characters to print an entire line. It has reference more particularly to that class of machines originated by myself, in which a series of disconnected matrices representing individual characters are, through the instrumentality of escapement mechanism, controlled by finger-keys delivered from a magazine, composed or assembled in line, justified, and presented to the face of the mold, which is then filled with molten type-metal to produce the required bar or linotype, which receives on its face an impression of the assembled matrices, after which the matrices are returned through a distributing mechanism to the magazine from which they started. The machine is of the same general organization as that represented in Letters Patent dated May 12, 1885, No. 317,828, and numerous patents of later date.

The purposes of my invention are mainly to simplify the machine, give greater durability to its parts, increase the speed of action, and secure under all circumstances perfect alignment of the characters on the linotype.

To this end it consists in improvements in the construction of the magazine, in the escapement mechanism for discharging the matrices from the magazine, in the assembling or composing mechanism, in the mechanism for presenting and clamping the matrices in front of the mold, in the manner of constructing, mounting, and operating the melting-pot, in the construction of the distributing mechanism, in an improved form of matrix, and in other details of minor importance.

In the accompanying drawings, Figure 1 is a front elevation of my improved machine. Fig. 2 is a side elevation of the machine looking from the right, portions being shown in section. Fig. $2^a$ is a cross-section of the magazine on the line 2 2 of Fig. $4^a$. Fig. 3 is a vertical cross-section through the key-board from front to rear on the line 3 3 of Figs. 1 and 47. Fig. $3^a$ is a side view of a part of one of the magazine-bars. Fig. $3^b$ is a side view of one of the escapement-operating weights and the rod connected therewith. Fig. 4 is a front elevation of a portion of the mechanism connected with the finger-keys, looking from the line 1 1, Fig. 3, in the direction indicated by the arrows. Figs. $4^a$, $4^b$, and $4^c$ are sections on the line 4 4 of Fig. 1, showing the escapement in its different positions. Fig. 5 is a perspective view of a portion of the assembling or composing mechanism and attendant parts looking from the front of the machine. Fig. $5^a$ is a vertical cross-section on the line 5 5 of the preceding figure. Fig. 6 is a front elevation of a portion of the mechanism for assembling the matrices and transferring the line to the casting mechanism. Fig. 7 is a view of the same parts at a different stage of the operation. Fig. 8 is a perspective view showing the jaws by which the assembled line of matrices is clamped and shifted laterally preparatory to its presentation to the mold. Fig. 9 is a vertical section on the line 9 9 of Fig. 1, showing the pivoted vise or matrix-support swung outward to give access to its parts. Fig. 10 is a vertical cross-section through the upper end of the vise on the line 10 10 of Fig. 1, showing the arrangement of screws for holding the same in operative position. Fig. 11 is a sectional view on the line 11 11 of Fig. 10. Fig. 12 is a side elevation of the vise detached. Fig. 13 is a front elevation of the same, showing also a part of the justifying mechanism supported thereby. Fig. 14 is a sectional elevation on the line 14 14 of the preceding figure. Fig. 15 is a longitudinal vertical section of the vise on the line 15 15 of Figs. 16 and 17. Fig. $15^a$ is a detail view of the vise. Fig. 16 is a vertical cross-section of the same on the line 16 16 of Fig. 15. Fig. 17 is a top plan view of the vise with its cap-plate removed. Fig. 18 is a cross-section on the line 18 18 of Fig. 19, showing the mechanism for transferring or shifting the linotype. Fig. 19 is a top plan view of the same. Fig.

Figure 48:
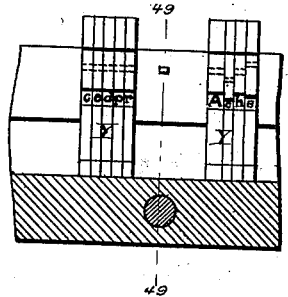
Figure 49:
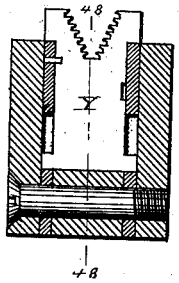
Figure 50:
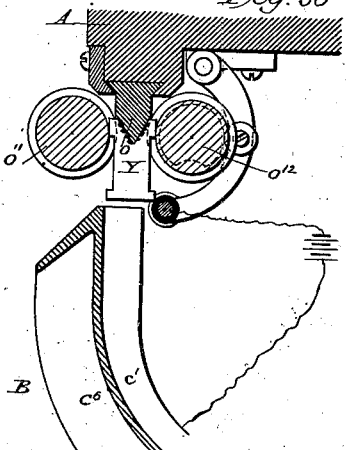

20 is a side view showing the pinion and rack for operating the clamp-screw of the vise. Fig. 20ª is a horizontal cross-section through the mold and a part of the clamping mechanism, illustrating the manner in which the mold is closed by the jaw or slide in the event of the matrix-line being too short, or of the mold being filled at a time when no matrices are presented thereto. Fig. 20ᵇ is a vertical section through the same parts. Fig. 21 is a side elevation showing the mold, the ejector, and their operating-cams, together with adjacent parts. Fig. 22 is a face view of the mold, the attendant parts being also shown in part in dotted lines. Fig. 23 is a top plan view, partly in section, showing the mechanism for imparting motion to the principal parts of the machine and for tripping the machine into and out of action. Fig. 23ª is a side elevation of the stop-motion gear from which the mold-wheel is driven. Fig. 24 is a side elevation of the same. Fig. 25 is a section on the line 25 25 of Fig. 24, showing a portion of the clutch-tripping mechanism. Fig. 26 is a vertical section through the mold, with the assembled line of matrices and the matrix-support in position for casting. Fig. 27 is a vertical central section through the melting-pot and adjacent parts on the line 27 27 of Fig. 28. Fig. 28 is a top plan view of the melting-pot and certain of its adjuncts. Fig. 29 is a side elevation showing the melting-pot, its operating mechanism, and attendant parts. Fig. 30 is a vertical cross-section through the melting-pot on the line 30 30 of Fig. 28. Fig. 31 is a cross-section of the same on the line 31 31 of Figs. 28 and 30. Fig. 32 is a vertical cross-section through the thermostatic gas-regulator on the line 32 32 of Figs. 38 and 33. Fig. 33 is a cross-section on the line 33 33 of Fig. 32. Fig. 34 is a side elevation of the principal parts of the casting mechanism and their operating devices, the melting-pot, the mold, and the vise or clamp which holds the matrices being shown in vertical section on the line 27 27 of Fig. 28. Fig. 34ª is a similar view of the parts in different positions. Fig. 35 is a side elevation of the distributing mechanism. Fig. 36 is an end view of the same. Fig. 37 is a longitudinal vertical section of a part of the distributer on the line 37 37 of Fig. 38. Fig. 38 is a vertical cross-section on the line 38 38 of Figs. 35 and 37. Fig. 39 is a side elevation of a portion of the distributer, showing particularly the means for lifting the matrices into engagement with the conveyer-screws. Fig. 40 is a perspective view showing in section portions of the distributer and of the receiving end of the magazine. Fig. 41 is a perspective view showing one of the inner walls of the distributer by which the space-bars are delivered from the line as the matrices pass to the distributer proper. Fig. 42 is a perspective view of one of the space-bars. Fig. 43 is a perspective view of the receiving portion of the distributer. Fig. 44 is a face view of the improved matrix. Fig. 45 is a vertical central section of the same on the line 45 45. Fig. 46 is an edge view of the same. Fig. 47 is a top plan view of the machine. Fig. 48 is a longitudinal vertical section of a portion of the matrix-support on the line 48 48 of Fig. 49. Fig. 49 is a cross-section of a portion of the matrix-support on the line 49 49 of Fig. 48. Fig. 50 is a vertical cross-section of a portion of the distributer on the line 3 3, Fig. 1.

*General organization.*—My machine is intended to deal with matrices, such as shown in Figs. 44, 45, and 46, and space bars or wedges, such as shown in Fig. 42. The matrices, properly assorted, are contained in the elevated magazine B, having a series of channels through which the matrices descend to the escapement devices D at the ends of the channels. These escapements are connected, respectively, through intermediate devices with finger-keys E, representing the various characters, and which actuate the escapements so as to discharge the matrices one at a time. The discharged matrices descend through guiding-channels F, and are received on the upper traveling surface of an inclined belt G, by which they are delivered successively into and assembled in line in the slotted assembling-block H. The space-bars are contained in the box P, from which they are delivered by a device connected with one of the finger-keys, so that they may descend into the assembling-block H to be added to the lines of matrices. As the line of matrices and space-bars is assembled it is held in compact form by a yielding resistant I. When the line is completed, the assembling-block H rises until it is flush with the top of a stationary guide K, whereupon the device J shifts the line from the assembling-head across the top of the guide into the vertically-sliding yoke L, by which they are lowered into the vise or clamping device M against the front face of the mold-wheel N, lying in front of a melting-pot. After the casting operation the yoke L rises and lifts the composed line to the distributing mechanism O at the top of the machine, where the space-bars are first delivered through the conductor R into the box P, and the matrices thereafter distributed and delivered into the magazine-channels from which they started, the yoke descending in the meanwhile to receive the next line of matrices. The linotype which is produced in the mold-wheel N is in the meantime ejected therefrom.

*Matrices.*—The matrices, which form permanent parts of the machine, are of the same general character as those represented in my previous patents, but differ therefrom as to certain details, which are fully represented in Figs. 44, 45, and 46. Each matrix Y consists of a thin plate of brass or equivalent material having in one edge the character or matrix proper $y$. The plate is preferably of a length somewhat greater than its width.

Its two ends are of equal width; but its edges are recessed, so as to produce at the upper end the shoulders $y'$ on opposite edges, and at the lower end the two shoulders $y^2$, also on opposite edges. The shoulders at the upper end are directly opposed to those at the lower end. In the upper end the matrix is provided with a central V-shaped notch having in its two sides the teeth $y^3$, adapted to engage and travel lengthwise upon the distributer-rail. These teeth are similar to those described in Letters Patent No. 378,797, dated February 28, 1888, except that, as shown in Fig. 44, they are beveled upward and inward toward the center of the matrix on their under edges instead of being beveled or inclined on their upper edges, as heretofore. This upward inclination of the matrix-teeth on the under edges is an important feature, for the reason that they cause the matrices to gravitate and travel in a central position along the distributing-rail. Thus formed the teeth may be fitted to travel freely and without danger of pinching at the edges on the rail, while at the same time they are prevented from swinging edgewise to inoperative positions.

*Space-bars.*—I employ in connection with the matrices, and in order to create and increase the spaces between them, for the purposes of justification, space-bars Z, such as shown in Fig. 42. These bars are practically identical with those represented in Letters Patent Nos. 345,525 and 345,526, dated July 13, 1886, except that they are widened edgewise at the upper end, so that the distance between their upper shoulders $Z^3$ is equal to the extreme width of the matrices, and this in order that the series of space-bars may remain suspended between guides so widely separated as to admit of the line of matrices being lifted out from between the space-bars at one action in a manner peculiar to the present machine and hereinafter explained in detail.

*Main frame.*—A represents the main frame, which may be of the form and construction shown, or of any other suitable form, provided only it affords a rigid support for the various operative parts hereinafter described.

*Magazine.*—In order to meet the practical requirements, the magazine tubes or channels should be of sufficient length to contain from twenty to twenty-five matrices each. In order that the magazine may be made of sufficient length without extending the machine to an objectionable height or placing the distributer out of the reach of the operator, I propose to bend or curve the magazine-channels between their ends in any form or manner which will admit of their upper or receiving ends being brought down to the required level. By thus bending the magazine-channels I am enabled to make them of great length and at the same time bring their two ends close together and in such position as to give ready access thereto.

In the drawings I have represented the magazine-channels of substantially ⊃ form, the receiving end extending upward and backward, while the lower end extends downward and forward, so that the matrices entering the same are carried first upward in the ascending portion of the magazine and then permitted to descend by gravity through its curved portion and thence downward in an inclined path to the point of delivery.

The magazine may be constructed in any appropriate manner, provided only it affords a series of passages or channels lying side by side and adapted to maintain the matrices on edge, as shown in the drawings. I prefer, however, the construction shown in Fig. 2$^a$, consisting of a base-plate $c$ and a series of ribs $c'$, seated on its top, with ribs or lugs $c^2$ passed through the plate and secured by pins $c^3$ or equivalent fastenings at the back. There will be two of these plates—one forming the upper and the other the lower part of the magazine—and they will be connected at their upper ends by the curved channels $c^4$.

To facilitate the proper distribution of the matrices, the upper ends of the magazine-channels are separated; but from this point to the lower ends they gradually converge, so that at the lower extremities the series of channels lie closely together and in a straight horizontal line, as plainly shown in Figs. 1, 2, and 47. This convergence of the channels may be secured by tapering the intermediate bars $c'$. In order to reduce the bearing-surface of these bars on the sides of the matrices and to permit the free escape of the air, so that the matrices may descend rapidly, I propose to groove the bars $c'$ longitudinally in their faces, as shown in Fig. 2$^a$.

In order to exclude the dust, covering-plates $c^5$ may be applied over the magazine-channels, as shown; but these plates are not essential.

At the upper or receiving end the magazine-channels communicate with corresponding channels in a plate or mouth-piece $c^6$, having in cross-section a semicircular form, so that the matrices falling therein from the distributer above pursue a semicircular path before entering the channels of the magazine proper. The plate $c^6$ is hinged to the magazine at $c^7$, so that it may be turned downward to give access to its interior channels. It is supported normally in its operative position by removable arms $c^8$ or other suitable device. The matrices pass from the plate $c^6$ into the magazine-channels in an upward direction. The channels of the plate rise slightly above those of the magazine, as shown in Figs. 2 and 40, thus producing a shoulder $c^9$, behind which the matrices engage as they enter the magazine, so as to prevent them from sliding backward. An overlying bar $c^{10}$, beveled on its under face, forces the entering matrices downward, so that they are certain to engage behind the shoulders.

For the purpose of forcing the matrices upward into the magazine channel, I provide the horizontal rotating shaft $c^{12}$, having blades or wipers $c^{13}$, which sweep over the inner face of plate $c^6$, so as to act, as shown in Fig. 40, upon the protruding edges of the matrices, which are forced forward positively thereby into the magazine.

*Matrix-delivering mechanism.*—The mechanism for delivering the required matrices from the magazine consists of the escapement devices and of the finger-keys and their connections for operating the escapements. There is an escapement at the mouth of each magazine-channel constructed as shown in Figs. 2, $4^a$, $4^b$, and $4^c$. Two pins $d$ and $d'$ are arranged to slide upward through holes in the bottom of the magazine and into one of the channels. These pins are jointed to a lever $d^2$ on opposite sides of its horizontal axis $d^3$, so that the vibration of the lever thrusts the pins into the channel alternately. A spring $d^4$ on a fixed support acts at one end against the lever $d^2$ and tends to thrust the lower pin $d$ upward. This action of the spring is, however, prevented when the parts are at rest, and the upper pin $d'$ is held normally in the elevated position, as shown in Fig. $4^a$, by means of a lifting-rod $d^5$, bearing at its upper end beneath the lever and resting at its lower end on a lifting-arm $d^6$, pivoted at $d^7$ to a weight $d^8$, mounted, as shown in Fig. 3, on a horizontal pivot $d^9$. The parts are so proportioned that when the weight stands normally in the position shown in Fig. 3 it maintains the arm $d^6$ and the lifting-rod in their elevated positions, as shown in Fig. 3. The weight rests normally on the upper end of a vertically-sliding pin $d^{10}$, which in turn rests upon the rear end of a finger-key or key-lever $d^{11}$, which is mounted midway of its length on a pivot $d^{12}$. When the forward end of this lever is depressed, its rear end raises the bar $d^{10}$, thereby swinging the free end of the weight $d^8$ upward and allowing the arm $d^6$ and rod $d^5$ to sink. This releases the end of the escapement-lever $d^2$, which is instantly moved by the spring $d^4$, so as to retract the upper pin $d'$ and raise the lower pin $d$. When the finger-key is released, the weight $d^8$ descends by gravity, and through the intermediate parts it restores the escapement to its original position by lifting the pin $d'$ and lowering pin $d$. In the normal position of the parts the lower or foremost matrix in the rear channel lies above the two pins, and its upper shoulder bears against the pin $d'$, whereby it is prevented from escaping. When, however, the pin $d'$ is withdrawn by the depression of the finger-key, the matrix is permitted to slide forward and downward until its shoulder engages the lower pin $d$, by which its movement is checked. When the finger-key is released, the pin $d$, disengaging from the matrix, permits it to escape, while at the same time the pin $d'$ rises in position to engage a shoulder at the upper end of the next matrix. Thus it is that the foremost matrix is started by the depression of the finger-key and discharged when the key rises. The successive positions of the pins and the matrices are clearly shown in Figs. $4^a$, $4^b$, and $4^c$.

In many escapement mechanisms now in use it is found that the operator will sometimes touch and release the key so quickly that the parts return to their original positions before the matrix has time to escape. It is to overcome this difficulty and insure the delivery of the matrix, although the key may be depressed to any extent, that I make use of the weight $d^8$. As this weight is free to rise from the lifting-pin $d^{10}$, the blow upon the key will give the weight sufficient impetus to cause it to swing upward to the full limit of the movement allowed. The time required for this movement and for the return of the weight by gravity is sufficient to insure the discharge of the matrix before the escapement-pins resume their normal positions.

I have described above the escapement mechanism for one of the type-channels. It is to be understood that this mechanism is repeated or duplicated for each channel.

In order to prevent conflict between the weights, and for other reasons, I extend the weights, $d^8$ alternately to the right and left of the central pivot $d^9$, as shown in Figs. 3 and 4, the connecting-arms $d^6$ and the lifting-rods $d^5$ being arranged to correspond. The lifting-arms $d^6$ slide at their upper ends through any suitable guide $d^{16}$, while the lower ends of the lifting-rods $d^5$ are mounted in like manner in a guide $d^{13}$. The lower ends of the rods $d^5$ are enlarged and provided with screws $d^{14}$, which bear on the arms $d^6$. This forms an adjustable connection by which the rods $d^5$ may be raised to secure the proper adjustment of the escapement-pins in relation to the other parts. This adjustable connection is not a necessary feature of my construction, but is adopted because it facilitates the assemblage and adjustment of the parts.

In order to prevent noise, I provide fixed cushions $d^{15}$ to receive the falling weights $d^9$.

As regards the connection between the finger-keys and the escapements, the essence of my invention resides in the employment of a weight which receives an impetus from the key and is then permitted to act independently, and it is manifest that the form of the details may be modified to a very considerable extent without changing, essentially, the mode of action or passing beyond the limits of my invention. Good results may be obtained by extending the escapement operating-rods $d^5$ directly to the finger-keys, thus dispensing with the intermediate weights; but the construction shown is preferred. The finger-keys are grouped in suitable rows or banks at the front of the machine in a frame or key-board such as shown or of any other suitable form.

*Assembling or composing mechanism.*— Below the escapement mechanisms I provide a series of descending channels or tubes F, lying side by side, in suitable position to receive the matrices as they are delivered from the magazine by the escapement devices. These channels F are intended merely to prevent the matrices from turning over, and may be less in number than the magazine-tubes. They terminate at different levels a short distance above an inclined endless belt G, which travels at its upper end around a cylindrical supporting-roll $g$ and at the lower end around a square or other polygonal roll $g'$. The upper surface of this belt, which receives the matrices from the channels F, travels in a downward direction, as indicated by the arrow. At the lower extremity the belt and its pulley $g'$ project slightly within the vertically-slotted assembling-block H, so that the matrices are delivered in an upright position into the latter. This assembling-block is of the form shown in perspective in Fig. 5 and in cross-section in Fig. 5$^a$, with a slot cut vertically into its top to receive the matrices, and with shoulders $h$ and $h'$ at the bottom of the slot to receive and sustain the matrices. As the matrices descend into the block they are shoved forward, one after another, by the corners of the wheel $g'$, and thus assembled in line side by side within the block H, as plainly shown in Fig. 5. If a matrix chances to reach the assembling-block simultaneously with a corner of the rotary block, it may rest between the belt and the arm $j'$ for an instant; but as the block is turned constantly forward the matrix passes down to its place in the assembling-block, and this so quickly that no pause is perceptible. A channel $p$, leading from the space-box, delivers the space-bars in like manner into the assembling-block, so that they are assembled in line with the matrices therein, their upper widened ends being supported on the top of block H.

In order to resist the advance of the lengthening line of matrices and hold them in compact order, I provide the resistant I, consisting of a finger $i$ on one end of a horizontal slide $i'$, connected by a link $i^2$ to the upper end of an angular weighted lever $i^3$, which is pivoted to the frame and which acts constantly to urge the finger $i$ to the right. The finger rises within the assembling-block, as shown in Fig. 5, in position to act against the forward end of the line of matrices. A dog $i^6$, pivoted to the frame, engages teeth on the lower edge of the resistant to hold it as it is moving forward. The corners of the pulley $g'$, forcing the line of matrices ahead, leave an open space for the entrance of the next matrix. It is to maintain this space that the dog $i^6$ is employed. Were it not for the dog, the resistant would urge the matrices backward as the corners of the pulley $g'$ cease their action.

The foregoing parts serve to assemble the matrices and space-bars in compact order. After the completion of the line it is necessary that it shall be lifted, shifted to the left, and finally lowered to the casting and clamping mechanism. The elevation is effected by means of the composing-head H, which is mounted on suitable guides to admit of its being lifted from the normal position (shown in Fig. 5) to the elevated position, (shown in Figs. 6 and 7,) so as to bring the matrices on a level with the top of the stationary guide-block K.

As a convenient means of lifting the composing-block, I pivot a hand-lever $k$ to the frame and connect it at one end with the assembling-block by a link $k'$ or otherwise. This hand-lever $k$ also serves, through its arm $k^3$, to disengage the dog $i^6$, so that the same operation which lifts the line of matrices causes the resistant I to return to its original position at the right preparatory to the composition of the next line after the assembling-block has again descended to its receiving position.

*Matrix-shifting mechanism.*—In order to effect the shifting of the matrix-line laterally from the assembling-block when the latter is fully elevated, I provide the device J, hereinafter designated as the "shifter," consisting of two horizontally-movable arms $j$ and $j'$, mounted on independent slides $j^2$ and $j^3$, as shown in Figs. 6, 7, and 8. These arms are urged constantly toward each other by a spring $j^4$, seated against the outside of the arm $j$ and acting against the head of a rod $j^5$, attached to the arm $j'$, or by a spring otherwise applied. The arm $j'$ is held normally to the right of the assembled line by the upper end of latch $j^6$, pivoted to the frame and preponderating in weight at its lower end, so that it engages automatically, while the arm $j$ is forced gradually to the left by means of the resisting-finger $i$, which encounters its lower end. The arm $j$ forms in effect an upward continuation of the resistant-finger $i$ during the time that the line is being assembled. When, therefore, the assembling-block H rises, it carries the line of matrices between the arms $j$ and $j'$. As the block completes its upward motion, a pin $h^6$ on its top trips the latch $j^6$ and releases the arm $j'$, allowing it to be moved toward its companion $j$ until the line is compressed and held between the two. The slide $j^2$, which carries arm $j'$, is connected by link $j^7$ to arm $j^8$, fixed on the horizontal rock-shaft $j^9$, mounted in the main frame. This shaft is provided (see Figs. 1, 2, 23, and 24) with a weighted arm $j^{20}$ and with an arm $j^{10}$, which latter is acted upon by the cam-face on the side of wheel $v$ on shaft V. At the proper time, after the line of matrices is completed and the parts unlocked, the cam $v$ acts through the intermediate parts and carries the shifter to the left from its normal position (shown in Fig. 6) to the position shown in Fig. 7, the arms $j$ and $j'$ carrying the line of matrices and space-bars between them from the assembling-block through the top of the fixed guide K into the vertically-movable yoke L. When this action is completed, and after the matrices are carried down out of the shifter by the yoke L, the shifter, relieved from the pressure of resistant $i$ and the influence of cam $v$, is returned to its original position by the weighted arm $j^{20}$.

*Matrix-supporting yoke.*—The yoke L slides upward and downward on the fixed vertical guide $l$, and is formed, as shown in Figs. 23, 26, and 34$^a$, with a vertical slot, the right end of which is open to admit of the matrices being advanced horizontally therein. This opening $l'$ is formed between the two horizontal arms $l^2$ and $l^3$, which have on their inner faces horizontal shoulders or ledges $l^4$ and $l^5$, upon which the upper shoulders of the matrices and the heads of the space-bars rest, as shown in Figs. 26 and 34$^a$. It is by means of these shoulders $l^4$ and $l^5$ that the aligned matrices are sustained within the yoke, and, finally, in front of the mold. The yoke has its arm $l^2$ formed with a shoulder $l^6$ to bear on top of the lower shoulders of the matrices on one edge to prevent them from rising. At the time the matrices are shifted into the yoke it stands at a considerable distance above the mold-wheel N, as shown in Figs. 1, 6, 7, 21, and 34$^a$. At the proper time, and by means hereinafter described, the yoke is caused to descend and lower the assembled matrices into position between the face of the mold-wheel N and the inner face of the vise M, between the jaws of the latter.

*Mold-wheel.*—I prefer to construct the mold in the form of a vertical disk mounted to revolve on a central stud $n$, and provided with a mold cell or slot $n'$, extending therethrough from the front to the rear face, as in my previous machine, the internal form and dimensions of this cell corresponding with those of the required linotype. The journal of the mold-wheel is fixed to a horizontal supporting-slide $n^2$, mounted in the main frame and actuated by a cam-wheel $n^3$, so that the mold is moved bodily to and from the line of matrices in the yoke. The mold is given an intermitting rotation through a pinion $n^{24}$ on its back, engaged by a pinion $n^{25}$ on a shaft $n^{26}$, which is extended horizontally rearward and provided with a stop-motion pinion $n^{27}$, driven by corresponding gear $n^{28}$ on the main shaft V. In its face the mold-wheel is provided with a groove $n^4$ in suitable position to receive the lower shoulders or projections on one edge of all the matrices, as plainly shown in Fig. 26. The engagement of the mold-wheel and the yoke over the lower shoulders of the matrices is an important feature of the present invention in that firm and accurate supports are thus provided against which to align the matrices by an upward pressure.

*Aligning matrices.*—The yoke L is connected, as in Fig. 34, by a link $l^7$ to one end of the lever $l^8$, pivoted to the main frame and vibrated by a rotary wheel $l^9$, hereinafter described in detail. These connections lower the yoke, in the first instance, so far that the shoulders of the matrices will freely enter the groove $n^4$ in the mold-wheel when the latter is advanced against them. After they are thus engaged by the wheel the operating devices exert a strong upward pressure on the yoke, which exerts a lifting influence beneath the upper shoulders of the matrices. This lifting influence is, however, resisted by the engagement of the lower shoulders within the groove of the mold-wheel, and thus it is that the mold-wheel serves, through its action on the lower shoulders of the matrices, to secure an accurate horizontal alignment of the matrices and the characters therein. In other words, the tensile strain applied to the matrices while they are interlocked with the mold-wheel at the lower ends insures acurate alignment of the characters or matrices proper in front of the mold slot or cell. The justification of the line is effected by forcing the long tapered members of the space-bars Z upward simultaneously, as in my previous machine. Under the present organization the upward strain or friction exerted by the rising space-bars on the matrices has no tendency to destroy the alignment, and this for the simple reason that the aligning pressure is applied in the same direction that the space-bars are advanced. In my previous machines the alignment of the matrices was secured by a downward pressure, while the justification was secured by an upward movement of the space-bars, and consequently the act of justification tended to counteract or destroy the alignment. This difficulty is wholly overcome by the arrangement herein shown. The essence of my invention in this regard lies in aligning the matrices by a strain or pressure applied against them in the same direction that the space-bars are advanced to justify the line.

The details of the mechanism for raising and lowering the yoke are plainly shown in Fig. 34. The lever $l^8$ is pivoted to the main frame at a point eccentric to the operating-wheel $l^9$, which is provided with a lateral projection $l^{10}$, which acts against a like projection $l^{11}$ on the side of the lever to effect its extreme elevation, and thereby lift the yoke to present the matrices to the distributing mechanism hereinafter described. The lugs or projections acting at a considerable distance from the fulcrum of the lever carry the latter upward steadily and forcibly. As the proper elevation is reached the operating-stud $l^{10}$ passes from under the stud $l^{11}$, thus permitting the wheel to continue its motion while the lever descends. The lever is also provided at a point near the fulcrum with a roller $l^{12}$ to ride on the peripheral cam-surface of the wheel $l^9$. The peripheral form of the cam is such that it encounters the roller just before the studs $l^{10}$ and $l^{11}$ separate, so as to give support to the lever and permit the lugs to separate with an easy and noiseless action. After thus receiving the weight of the lever the cam permits the lever to sink slowly until the yoke is in its receiving position, where it is retained until the new line of matrices is received from the shifting device, after which the cam permits the parts to descend until the yoke is in its lowest position with the matrices in front of the mold. After this and after the mold-wheel has advanced to engage the lower ends of the matrices the cam exerts a moderate upward pressure on the lever and yoke sufficient to apply the tensile aligning strain to the matrices, as before explained.

*Matrix-clamping mechanism.*—After the assembled matrices and space-bars are presented by the yoke in front of the mold they must be firmly supported against the face of the advancing mold-wheel, and must also at the same time be subjected to lateral pressure—that is to say, to pressure applied to the ends of the line—in order to hold their side faces in intimate contact when the space-bars or wedges are advanced and prevent the entrance of molten metal between them. For this purpose I employ a clamping mechanism which, as a whole, I commonly term the "vise." In its general construction it resembles the corresponding mechanism in Patent No. 378,798, dated February 28, 1888. It consists, primarily, of a frame N, (shown in Figs. 9, 12, 13, 15, and 17,) the head of which is in suitable form and position to bear against the front vertical face of the yoke when the latter is lowered in front of the mold, as shown in Figs. 26 and 34, in order to give the yoke and matrices a firm support against the horizontal pressure of the mold-wheel.

In order to relieve the parts from excessive strain and to insure a pressure such as will maintain intimate contact between the mold-wheel and the edges of the matrices supported in the yoke, I propose to provide the head of the vise-frame, as shown in Fig. 26, with a bar $m^2$, seated in a groove and supported by a rubber or other spring $m^3$, its outer edge being exposed to bear against the yoke. This yielding support is not, however, a necessary feature of my machine. The head of the vise is also provided with two jaws $m^4$ and $m^5$, extending horizontally inward or rearward in such position that the matrix-line is lowered between them by the yoke. The jaw $m^4$, although adjustable by the sustaining-nuts $m^{50}$ on the screw-rod $m^7$, is normally fixed in position. The jaw $m^5$ is attached to a sleeve $m^6$, arranged to slide loosely over the outside of the horizontal screw $m^7$, which latter is seated to turn in the head of the vise and fixed against end motion by a reducing-neck on its end extended through the frame and secured to the outside pinion $m^{14}$. A spring $m^8$, seated in the vise, acts against the pin $m^9$ on the sleeve $m^6$, and thus tends constantly to advance or close the jaw $m^5$ toward its companion $m^4$ to compress the matrix-line endwise. Previous to the lowering of the matrices by the yoke the jaw $m^5$ stands in close proximity to the jaw $m^4$, as shown in dotted lines in Fig. 15; but as the shifting device J, heretofore described, advances the line of matrices into the yoke above the vise the shifter-arm $j$ encounters the jaw $m^5$ and forces it to the left, as indicated in Fig. 15, thus effecting a sufficient separation of the jaws $m^4$ and $m^5$ to permit the entrance of the matrix-line when it is lowered. As the jaw $m^5$ is carried backward, it is retained by a spring-actuated dog $m^{12}$, which is pivoted to the vise-head and arranged to engage teeth or serrations $m^{10}$ in the jaw-supporting sleeve $m^6$. A pin $m^{11}$, bearing on this dog, protrudes at the top of the vise in position to be acted upon by the descending yoke, so that when the yoke lowers the matrices between the jaws it at the same time releases jaw $m^5$, so that it may be advanced by the spring. This insures a closure of the matrices together whether the line is long or short.

In order to secure forcible compression, a non-rotating nut $m^{13}$ is mounted on the screw $m^7$, in position to act against the rear end of the sleeve $m^6$, so that when the screw is turned in the proper direction this nut advances the sleeve and its jaw $m^5$ positively and forcibly toward the opposite jaw. The nut is unconnected with the sleeve, and therefore the sleeve and jaw are free to advance under the influence of the spring when the dog is tripped, although the nut and screw may remain inactive. The spring-closure of the jaw is intended to prevent the injection of the molten metal between and around the matrices in the event of the casting devices being accidentally operated before the closure of the jaw by the screw, or at a time when there is an insufficient number of matrices to complete the full line. When the line of matrices thus clamped is shorter in length than the mold proper, it is of course necessary to cover and close that portion of the mold which extends beyond the matrices in order to prevent the molten metal from escaping at the front. This closure is effected by the jaw $m^5$, which is adapted to slide closely against the face of the mold-wheel. In the normal condition of affairs the mold is entirely covered by the matrices and space-bars; but if the line falls short, so that the jaw $m^5$ must move inward beyond its usual point to compress the line, it will in so doing cover and close the exposed part of the mold—that is to say, the part extending beyond the matrix-line—and thus produce a blank surface on the corresponding part of the linotype. If, through any accident, the matrix-carrying yoke should descend in front of the mold without carrying matrices thereto, the jaw $m^5$, being released by pin $m^{11}$, as before explained, will pass inward to the jaw $m^4$ and close the entire face of the mold. The result will be a bar, slug, or linotype blank on its entire front edge, adapted for use after the manner of ordinary leads for spacing purposes.

In the normal operation of the machine dependence is placed upon the screw to apply the requisite pressure. The screw is turned, as shown in Figs. 12, 13, 15, 17, and 20, by a segmental pinion $m^{14}$, fixed on its end and actuated by a vertically-reciprocating rack-bar $m^{15}$, connected with the justifying-slide hereinafter described. This mode of turning the screw is similar to that in my previous machine; but I have now applied an improvement in the shape of an arm $m^{16}$, attached to the end of the screw in position to be acted upon by the end of the rack-bar and to slide upon the face of the bar as the latter moves upward and downward after its teeth are disengaged from those of the pinion. This arm serves as a lever against which the rack-bar acts with great advantage to assist in turning the screw, and it further serves, as shown in dotted lines, as a rest or stop to bear against the face of the rack-bar to hold the screw from backward rotation and thus relieve the ends of the pinion-teeth from the customary friction and wear to which they were subjected by the rack-bar sliding against them. The jaws are closed by the rising movement of the rack-bar. When it is fully elevated and when the parts are subjected to the severest strain by the wedging action of the space-bars, the screw is firmly held by the arm $m^{16}$ resting against the smooth face of the rack-bar.

It will be observed that when the mold-wheel advances the matrices are supported on the front side at both ends against the forward arm $l^2$ of the yoke, and that they are supported on the rear side against the face of the mold and against the rear arm $l^3$ of the yoke. In order that the arm $l^3$ may apply a firm pressure, the mold-wheel is adapted, as shown in Fig. 26, to act horizontally against said arm $l^3$. To insure this pressure the wheel is provided, as in Fig. 26, with one or more adjustable screws $n^5$, which may be set forward to act against the yoke.

In practice I find that the construction of the matrices with their two ends of equal width, so that they may be clamped and supported edgewise at both ends, is a feature of great importance, in that it secures an accuracy of alignment and firmness of support unattainable with matrices having one end wider than the other. At the time of the final alignment the matrices are subjected to a very considerable pressure and their side faces bear against each other with much friction. When the matrices are widened at one end only, it is found that the friction between them at that end is greater than at the other, and that the edgewise pressure is liable to cause inaccuracy of alignment.

When it is considered that a variation of one one-thousandth of an inch is fatal to the production of satisfactory type, the importance of my improvements will be understood.

In order to permit convenient access to the parts of the vise or clamping mechanism, its frame $m$ is connected to the main frame by a horizontal pivot $m^{20}$, so that the entire clamping mechanism may be swung forward, as represented in Fig. 9. Under ordinary circumstances the frame is locked rigidly in its upright position by means of hand-screws $m^{17}$, which are threaded therethrough and provided at their rear ends with T-heads $m^{18}$, which enter and engage within slotted openings $m^{19}$ in the main frame, as shown in Fig. 11. The heads being turned to the proper position enter the slots freely. A partial rotation of the screw causes them to lock therein, so that the screw is held from moving endwise, while at the same time the continued rotation forces the vise home tightly to its place. This tightening action is relied upon simply to insure a firm bearing between the parts, and the movement required is so slight that it may always be effected by less than a half-turn of the screws. Consequently there is no danger of their being turned forward so far as to disengage.

*Melting-pot and pump.*—The rear side of the mold-cell is closed at the time of casting by a movable pot in which a large body of molten metal is contained and from which the metal is delivered into the mold by a pump. One of the serious difficulties heretofore encountered in this class of machines was the excessive transmission of heat by conduction from the melting-pot to the mold, clamping mechanism, and adjacent parts. In order to remedy this difficulty, I mount the melting-pot as a whole upon legs $s$, which are extended downward into the base of the machine as far as practicable from the casting appliances and mounted on horizontal pivots $s'$. This arrangement permits the pot to swing horizontally to and from the mold, but compels the heat to pass a long distance, or through a long intervening mass of metal, before it can be conducted to the mold or vise. The melting-pot proper $s^2$ is seated in a suitable pocket formed on top of the legs $s$, and is insulated therefrom by a layer $s^3$ of asbestus or similar non-conductor of heat. The vibration of the pot is secured, as shown in Fig. 29, by a cam-wheel $s^4$, mounted on the horizontal main shaft V and acting against a roller on the upper end of an arm $s^5$, which is mounted on the pivot of the melting-pot and arranged to act at its upper end through an intervening spring $s^6$ on the rear side of the pot. The spring $s^6$ is mounted on a rod $s^7$, pivoted to the pot and extended through the vibrating arm, with a nut on the rear end. The spring causes the pot to act with a yielding pressure against the rear face of the mold and the latter to bear with a yielding pressure against the matrices. The pot terminates in a wide delivery-mouth $s^8$, adapted to fit against and close the rear side of the mold-cell, and having a narrow slit or line of holes $s^9$, through which the metal is projected into the mold. The pot is formed with two vertical cylinders $s^{10}$ and $s^{11}$, the first opening at its bottom into the mass of molten metal, and also communicating through openings $s^{12}$ with the cylinder $s^{11}$. The cylinder $s^{11}$ communicates with the discharge-orifice $s^9$, but has no communication with the mass of metal in the pot except through the top openings $s^{12}$. A cup-like piston $s^{13}$ rises and falls in the cylinder $s^{10}$. On descending it is filled with molten metal, and as it rises it lifts this metal until finally a hole $s^{14}$ in its side communicates with the opening $s^{12}$, whereupon the molten metal flows from the piston into the second cylinder $s^{11}$. This second cylinder contains a vertically-movable piston $s^{15}$, which stands normally above the openings $s^{12}$. On descending past these openings it drives the metal before it through the delivery-orifice into the mold with a positive action. It will be observed that the first cylinder and piston serve as a feeder for the cylinder $s^{11}$, so that the same quantity of metal will be acted upon by the piston $s^{15}$ at every descent. The arrangement also serves to maintain a uniform level of the molten metal within the delivery-cylinder, so that at each action of the pumping mechanism the metal is delivered to the mold under precisely the same conditions. This is advantageous in that it secures a uniformity of casting, and also in that the piston can deliver but a limited amount of metal into the machine in the event of the pump being accidentally operated at an improper time. The two pistons may be operated by any appropriate means; but, as shown in the drawings, they are connected by links to a block $s^{16}$ on an operating-lever $s^{17}$, pivoted to the main frame. The block is adjustable lengthwise of the lever by a screw $s^{18}$, so that the stroke of the pistons may be increased or diminished. The lever is of angular form and is depressed, as shown in Fig. 29, by a suitably-guided pin $s^{20}$, urged downward by a spring $s^{21}$. The elevation of the lever is effected by a cam-wheel $s^{22}$, which acts on its end. The peripheral form of this wheel is such that, although it raises the lever and pistons gradually, it permits the spring to operate the lever and depress the pistons with a quick action.

*Vacuum apparatus.*—In order to insure solidity of the linotypes or castings, I propose to connect with the mold an exhausting apparatus of any appropriate character to produce as nearly as practicable a vacuum therein before the admission of molten metal and to provide a suitable valve by which the passage to the vacuum apparatus may be closed to prevent the molten metal from escaping therethrough. In their preferred form these parts are plainly shown in Figs. 27, 28, 30, and 31, in which $t$ represents a passage leading from the mouth of the melting-pot and communicating through pipe $t'$ with an exhaust-pump $t^2$ or other exhausting apparatus of ordinary form. A vertically-movable valve $t^3$ serves to close communication between this exhaust-passage and the delivery-opening $s^9$. The valve is connected to a lever $t^4$, actuated by a link $t^5$, the upper end of which is slotted to receive the pin $t^6$ on the piston-operating lever. When the pump-pistons are raised, the vacuum-valve $t^3$ is opened and the air is drawn from the mold through the mouth $s$ and passage $t$. As the pump-pistons commence their descent before acting to deliver the metal, the vacuum-valve, being released by the descending lever $s^{17}$, is closed by gravity and the atmospheric pressure, after which the pump-piston delivers the molten metal to the exhausted mold. The essence of the invention in this regard resides in combining with the mold exhausting devices, and it is manifest that the details may be modified within the range of mechanical skill.

*Automatic heat-regulator.*—It is important that the temperature of the metal in the melting-pot shall be kept as nearly uniform as possible, and to this end I provide a thermostatic regulator, through which the gas passes to the burner. The details of these parts are plainly shown in Figs. 27, 32, and 33. The pot is heated by a flame from a gas-burner $u$. The gas-supply pipe $u'$ enters the top of a chamber $u^2$ and is compelled to pass beneath a partition $u^3$ in order to escape at the opposite side. The lower part of the chamber contains a body of mercury $u^4$ and communicates through pipe $u^6$ with a bulb or chamber $u^7$, also filled with mercury. Under the proper condition of the parts the surface of the mercury stands at such distance below the partition as to allow the gas to pass; but as the temperature increases the expansion of the mercury reduces the space between its surface and the partition, thus lessening the area of the gas-opening and reducing the flow of gas to the burner, so that the flame is diminished and the temperature in the pot permitted to fall.

In order that the machine may be adjusted for higher or lower temperature at will, I tap a screw $u^5$ through the mercury-chamber, so that its end enters and displaces the mercury, thereby raising its level. By thus adjusting the screw the normal size of the gas-passage may be increased or diminished. The mercury-chamber $u^7$ may be located, as shown, at the forward end of the melting-pot or at any other suitable point.

*Justifying mechanism.*—The justification is effected after the matrices are in position within the vise and against the front of the mold, and is secured by forcing the long tapered members of the space-bars upward simultaneously, as in my earlier machine. Their elevation is effected by a vertically-movable slide W, mounted in the frame of the vise. The justification is effected, as in Patent No. 378,798, dated February 28, 1888, by two movements of the slide W—first, a gentle elevation of the slide to lift the tapered bars and effect a proximate justification, and thereafter and after the matrices are aligned a forcible elevation of the tapered bars to complete the justification. One of the present improvements relates to mechanism for giving this double movement to the justifying-slide. As shown in Figs. 13, 14, and 34, the slide W is mounted to move vertically on a secondary slide $w$, which is in turn connected through a yielding link $w'$ with an operating-lever $w^2$. The slide W is urged constantly upward in relation to its supporting-slide by a weighted cord $w^3$, attached at its end to the main slide and passing over a pulley $w^4$ on the secondary slide. The secondary slide is provided with a pivoted latch $w^5$ to engage with the main slide and hold it down. When the secondary slide is carried upward, its latch engages with the main slide W, as shown in Fig. 14, so that the two slides are compelled to descend together. At the proper time the operating devices move the two slides slowly upward, whereupon a pin on the latch $w^5$ encounters an inclined plate $w^6$, whereby the latch is disengaged from the frame W and the latter permitted to move suddenly upward under the influence of the weighted cord to effect the primary justification. At the proper time the secondary slide, continuing its upward movement, overtakes the main slide and forces the latter positively upward against the space-bars to complete the justification. The trip-plate $w^6$ is formed with a T-shaped slot therethrough, so that while the latch passes upward through the vertical portion of this slot the trip-pin straddling the slot rides against the inclined face of the plate to disengage the latch. As the latch completes its ascent, the pin reaches the widened portion of the slot and passes therethrough, allowing the latch to re-engage the main slide. During the descent of the parts the trip-pin on the latch passes downward inside of the trip-plate, as shown in Fig. 34. In order that the plate may yield for this purpose, it is sustained on a rock-shaft $w^8$, acted upon, as in Figs. 13 and 34, by the spring $w^9$. The final elevation of the justifying devices is effected by a weighted lever $w^{11}$, pivoted to the main frame and acting on the lever $w^2$ through a link $w^{12}$. The speed of the elevation is limited and the depression of the parts effected, as shown in Fig. 34, by a cam-wheel $w^{13}$, acting on a roller $w^{14}$ on the lever $w^2$.

*Type-ejecting devices.*—The linotypes are ejected from the front of the mold, as shown in Figs. 21, 22, and 23, by a horizontal ejecting-slide X, mounted on suitable guides and operated through an intermediate link $x$ from a lever $x'$, pivoted to the main frame. The ejector stands in position to pass into and through the cell in the mold-wheel from the rear after the wheel has made one-fourth of a revolution from the casting position, so that the linotype stands in an upright position, or, in other words, on end. It is desirable to move the ejector forward forcibly and slowly, but to retract it quickly in order to permit the rotation of the mold at the proper time. To this end I provide a revolving wheel $x^4$, with a plate or shoulder $x^5$, to act against the end $x^6$ of the lever. As the operating shoulder is carried forward, it carries the end of the lever before it until the required limit is reached, at which time the end of the lever passes beyond the path of the operating-shoulder, so that action of the latter ceases. The return of the lever is effected by a second shoulder or plate $x^7$, attached to the same wheel as the first and arranged to act upon a shoulder $x^8$ near the fulcrum of the lever. This second plate and shoulder come into action immediately after the lever has completed its forward movement, and they move the lever quickly backward until it reaches its normal position, at which instant the shoulder of the lever passes beyond the operating-shoulder.

*Type-dressing mechanism.*—In order to give the linotype smooth parallel surfaces, I provide the machine with a trimming mechanism, such as shown in Figs. 18 and 19, through which the linotypes are forced by the ejector as they emerge from the mold. This device, which is very similar to those in my earlier machines, consists, primarily, of block $a$, adjustably connected to the frame by screws $a^2$ $a^3$, and provided with a slot $a^4$, through which the type is driven in the direction indicated by the arrow. A plate $a^5$, sustained by springs $a^9$, supports the type and guides the same in its passage over knife $a^6$, fixed adjustably to the frame by screw $a^7$. By these devices the linotype may be dressed to any desired thickness, so as to secure without changing the mold the effect of more or less "leading" or spacing between the lines of print. As each linotype emerges from the dressing mechanism at the front of the machine it is acted upon by an upright laterally-vibrating finger $w^{20}$ (see Figs. 13 and 22) and carried sidewise into a galley or receiver. The finger $w^{20}$ is pivoted at its lower end, urged to the left by spring $w^{21}$, and forced to the right at the required time by roller $w^{22}$, carried by the justifying-slide.

*Distributing mechanism.*—The distributing mechanism consists, fundamentally, of a horizontal bar having thereon horizontal ribs or teeth to engage and suspend the matrices, the teeth being permuted like those of the matrices, so that as each matrix is passed lengthwise of the bar it will be suspended by one or more pairs of teeth until it arrives at a point immediately over the upper magazine-channel, at which time it will slowly disengage from the bar and fall by gravity. In this particular the present distributer is practically identical with that shown and described in Letters Patent No. 347,629, granted to me on the 17th day of August, 1886. The present improvements relate mainly to means for presenting the matrices successively to the distributing-rail and to means for advancing the matrices lengthwise of the rail.

Referring to Figs. 1, 35, 39, &c., $o$ represents a stationary distributer-rail secured horizontally in the top of the frame, with its lower longitudinal toothed edge exposed. In advance of this rail there is fixed a grooved block or guide $o'$, adapted to receive and sustain the line of matrices. This guide stands in position to register with the yoke when the latter is raised to its highest elevation, (indicated by the dotted lines in Fig. 35,) so that the line of matrices and space-bars may be moved horizontally to the right out of the yoke and into block $o'$, this delivery of matrices being effected by a horizontal slide $o^3$, similar to those used in my previous machines. After this delivery of the matrices from the yoke the latter descends, leaving the matrices in the guide $o'$. The vertical walls in this guide are formed, as shown in Figs. 38 and 41, with horizontal ledges to sustain the matrices, and are also provided with oblique grooves $o^4$ for the passage of the ears or projections on the upper ends of the space-bars. The form of the matrices prevents their escape through these grooves; but as they pass forward across and beyond the grooves the space-bars drop out, one after another, into the conductor R, whence they pass into their box or magazine P. As shown in Figs. 37 and 38, the distributer-rail extends through the top of the guide $o'$, and is provided immediately over the grooves $o^4$ with horizontal teeth $o^5$, to engage the teeth of the matrices and sustain them to insure their passage smoothly across the grooves. The guide $o'$ terminates at the right somewhat to the left of the point at which the distributer-teeth on the rail commence. (See Fig. 37.) The guide terminates, as shown in Fig. 43, in four projecting lips $o^6$ and $o^7$, which engage beneath the shoulders of the foremost matrix, so as to give the same support and prevent it from falling out of position. The line of matrices is urged constantly forward and the matrices are lifted successively from the end of the line and from the supporting-lips $o^6$ $o^7$ to the level of distributing-rail above. This lifting is effected by an underlying vertically-vibrating finger $o^8$, (see Figs. 36, 37, and 38,) pivoted to the frame at $o^9$, elevated by a spring $o^{10}$, and depressed at frequent intervals by an overlying cam $o^2$. As each matrix advances to the end of the line to take the place of the one previously removed, it is brought over the lifting-finger. As the matrices are lifted, they must advance horizontally into engagement with the rail, so as to be suspended therefrom, and then advanced along the rail to the points of discharge. This is effected by two parallel horizontal screws $o^{11}$ and $o^{12}$, lying on opposite sides of the distributer-bar. The screws are formed with square threads of suitable size, and are so located and timed in their revolutions that their threads will engage the upper ends of the matrices, as shown in Figs. 40 and 50. As each matrix passes forward to the right beyond the detaining-lips $o^6$ $o^7$, it is immediately grasped at its edges by the screws, and, riding momentarily at its lower end on the horizontal extensions of lips $o^7$, (shown in Figs. 36, 39, and 43,) it is sustained thereby until it has advanced so far that its teeth engage the distributer-rail, by which it is thereafter sustained until the point of delivery is reached. The two screws, being revolved at equal speeds and in the proper direction, maintain a horizontal separation between the matrices and feed the matrices steadily and positively along the distributer-rail. When they reach the proper points for disengagement, the matrices drop from the rail without interference from the screws into the receptacle below. The inner screw $o^{12}$ is mounted in fixed bearings and the cam to operate the lifting device mounted on one of its journals. The forward screw $o^{11}$ is mounted in hinged bearings $o^{13}$, so that it may be turned forward and upward to give access to the distributer-rail to permit the removal of misplaced matrices, if required. I prefer to gear the two screws together by pinions $o^{15}$ and $o^{16}$, as shown in Fig. 2, and to drive them through an intermediate gear $o^{17}$ from a wheel $o^{18}$ on the shaft $c^{12}$ of the rotary wiper, and it is manifest that the details of the driving mechanism may be varied at will. I prefer to employ at least two screws for advancing the matrices; but I find that in some cases three screws may be employed, as in my application Serial No. 329,909, while in other cases a single screw will suffice.

*Driving mechanism.*—Motion is communicated to the machine, primarily, by a constantly-running pulley $q$, connected by a clutch at the end of a horizontal driving-shaft Q, which latter is in turn connected by a pinion $q'$ to the overlying wheel $q^9$ on the end of the main shaft V. The driving-clutch consists of the axially-movable toothed head or clutch $q^2$, suitably fixed to the shaft and arranged to engage the hub of the wheel. This driving-head is controlled by a spindle $q^3$, located centrally within the shaft, a helical spring $q^4$ being applied to throw the clutch into engagement when the spindle is released. The inner end of the spindle is connected through slots in the shaft with an encircling collar $q^5$, which engages a forked lever $q^6$ on the lower end of a vertical rock-shaft $q^7$, the upper end of which is provided with a hooked arm $q^8$. This upper arm stands close to the periphery of the wheel $v$ on the upper shaft. This wheel carries a laterally-yielding or spring arm $q^{10}$, the outer end of which is in the form of an eccentric hook or cam to engage the arm $q^8$. Each revolution of wheel V is attended by all the actions necessary to complete the casting and discharge of a linotype. As the wheel completes the rotation, its arm $q^{10}$, actuating arm $q^8$, causes the latter to throw the driving-clutch $q^2$ out of action, thus permitting the entire clamping and casting mechanism and attendant parts to stop, while the assembling mechanism, independently driven from the pulley $q$, remains in motion. When the clutch is to be again engaged, the latch or arm $q^{10}$, which holds the clutch out of action, is disengaged by an elbow-lever $q^{11}$, mounted on vertical shaft $q^{13}$ and actuated by a stud $q^{14}$ on slide $q^{15}$, under the control of the operator. This slide also has a slotted connection with the clutch-operating arm $q^6$, so that when pushed inward it will disengage the clutch at any required point in the action of the parts.

I do not claim herein the clutch and controlling mechanism above described, nor do I claim herein the casting and assembling mechanism independently driven, as these features are separately claimed in application Serial No. 329,908, filed November 11, 1889.

*General suggestions.*—It will be understood that the mold need not be in the form of a revolving wheel. So far as the action of the melting-pot, the clamping devices, and the matrix is concerned, a mold of any other external form may be employed.

While I have described herein weights for operating various portions, it will be understood that springs may be employed as equivalents. It will also be understood by the skilled mechanic that the details of the driving mechanisms may be variously modified at will, provided only they are adapted to impart the requisite movements to the operative parts.

The operation of the machine is as follows: The operator manipulating the finger keys causes the matrices E to be delivered by the escapement mechanism from the mouths of the magazines into the conductors F, which in turn deliver them to the inclined belt G, upon which they descend one after another in a common path to the assembling-block H, in which they are forced against the yielding resistant $i$ and assembled in line by the corners of the rotary block $g'$. From time to time, as occasion requires, the operator, touching the appropriate key, causes the space-bars to be dropped into the assembling-block in advance of the rotary block, by which each space-bar is carried forward and added to the line in the same manner as the matrices. When the line is completed, the lever $k$ is operated, causing the assembling-block to rise and carry the assembled line between the arms $j\ j'$ of the shifter. The same action releases the shifter, which under the influence of cam $v$ immediately moves to the left, carrying the line of matrices out of the elevated assembling-block through the guide K into the yoke L. The yoke then descends, while the shifter and the assembling-block H return to their original positions. The yoke L presents the matrices and space-bars in front of the mold and within the clamping devices. The space-bars are then lifted and the clamps actuated so as to justify the line and clamp the same firmly against the face of the mold, which is moved forward with the mouth of the melting-pot held closely against its rear face. The pump is actuated and the mold filled with metal, which in solidifying receives upon its edge an impression of the aligned matrices, the result being a linotype such as is now familiar to every person skilled in the art. The mold and clamps being released, the elevator lifts the line of matrices and the space-bars to the top of the machine, where the matrices are delivered to the distributing mechanism, by which they are returned to the magazine, while the space-bars descend through the tube R to the receptacle P. The mold makes a partial revolution, presenting the linotype in front of the ejector X, by which it is delivered from the mold-wheel through the dressing or trimming devices to the galley or other receiver at the front of the machine.

I do not claim herein the rack-bar $m^{15}$, the clamp-operating screw $m^7$, with the arm $m^{16}$ and pinion $m^{14}$, or the combination of said parts with each other or with the clamping-jaws, as they are claimed in a divisional application filed by me on the 12th day of August, 1890, Serial No. 361,848.

Having thus described my invention, what I claim is—

1. The type-matrix having two ends of equal width and two opposing shoulders in each of its edges, substantially as described and shown.

2. A type-matrix provided near its opposite ends with opposing shoulders, whereby it is adapted to receive a tensile strain by devices acting against said shoulders.

3. The combination of a series of matrices provided with sustaining-shoulders and a series of space-bars having shouldered ends of a width greater than the matrices, whereby the space-bars are adapted to extend edgewise beyond the matrices when assembled in line therewith.

4. The matrices having the shouldered ends and the relatively narrow bodies with parallel edges, in combination with the space-bars having their body portions of the same width as the matrix-bodies, but their ends of greater width than the extreme width of the matrices.

5. In combination with the matrices and a grooved or channeled guide to sustain them, the space-bars having their ends widened beyond the matrices and seated on distinct supporting-surfaces on the guide.

6. The magazine having its channels inclined upward from the receiving end and then returned with a downward inclination, substantially as shown and described.

7. In a magazine, the combination of the base-plate and the tapered ribs or bars secured thereto, whereby a series of converging non-communicating channels is produced.

8. The magazine consisting of the plate and the series of bars secured thereto to form channels, the bars being provided in their side faces with longitudinal grooves of less width than the bars, whereby air-passages are provided at the sides of the matrices or type.

9. The magazine consisting of the upper ribbed plate, the underlying ribbed plate, and the curved channeled connection between them, substantially as described and shown.

10. In combination with the channeled magazine, the channeled mouth-piece hinged to turn outward from its operative position, whereby access is afforded to the channels of the mouth-piece and the ends of the magazine-channels.

11. In combination with the channeled magazine, the channeled mouth-piece and the wiper, substantially as described, to advance the matrices from the mouth-piece to the magazine.

12. The magazine, the channeled mouth-piece with shoulders at the delivery end to retain the matrices, and the rotary wiper to advance the matrices past the shoulder, said members constructed and combined substantially as described.

13. In combination with the magazine and mouth-piece with the matrix-sustaining shoulders, the wiper or feeder and the beveled bar to compel the engagement of the matrices behind the shoulders.

14. A magazine-tube inclined upward from its receiving end and provided at said end with a fixed bottom lip or shoulder, which the incoming matrices engage by gravity, substantially as shown and described.

15. In a composing mechanism, a magazine extending upward from its receiving end and then downward to the delivery end, in combination with a feeder or wiper, substantially as shown, acting to lift the matrices into the receiving end, and an escapement at the opposite end to control their delivery.

16. A distributing mechanism from which the matrices are dropped, in combination with a channeled mouth-piece to receive them, a magazine rising from the mouth-piece, and a wiper acting to lift the matrices from the mouth-piece into the magazine.

17. The series of inclined magazine-channels arranged side by side and adapted to sustain the descending matrices on edge, in combination with the series of escapements having the pins arranged to alternately enter the channels from the edge, as distinguished from the side, to engage the side edges of the matrices.

18. In combination with the magazine, the two alternately-acting pins and their actuating-lever, the spring tending to depress the upper pin, the finger-key, and a connection, substantially as shown, between the key and the lever, whereby the matrix is discharged when the finger-key is released.

19. In combination with the magazine and the escapement, a weight connected to the escapement to actuate the same and a finger-key acting upon the weight to lift the same, whereby the momentum of the weight is rendered available to actuate the escapement and prolong its action in the event of the finger-key being suddenly released.

20. The finger-key, the independently-movable weight, and the pin or like device through which the key lifts the weight, in combination with the escapement and the escapement-operating rod actuated by the weight.

21. The finger-key, the weight actuated thereby, the arm pivoted to the weight, the rod, the adjustable connection between the arm and rod, and the escapement connected to the rod, all combined substantially as described and shown.

22. In combination with a channeled magazine and escapements to deliver the matrices one at a time therefrom, the traveling belt beneath the magazines to receive the matrices, the assembling-block H, to receive the matrices from the belt, and the polygonal wheel acting to sustain the belt and to advance the matrices within the block.

23. In a composing mechanism, a traveling belt of substantially the same width as the matrices or type, in combination with a magazine and escapement mechanism arranged to deliver the type upon the belt in a common line and lengthwise thereof, whereby they are carried endwise in a common path toward the assembling-point without being turned or shifted on the belt.

24. In combination with the narrow inclined traveling belt, the overlying magazine arranged to discharge the matrices endwise upon the belt at different points in its length, whereby they are caused to travel end to end one after another in a common path.

25. The magazine and escapement mechanism to deliver the matrices therefrom, in combination with the channels F and the inclined traveling belt.

26. In combination with the shouldered matrices, the slotted assembling-block to receive them, open at its bottom, and the angular wheel acting within the slot of the assembling-block.

27. The vertically-movable assembling-block into which the matrices are delivered from one end, in combination with the horizontal slide having the rigid resisting-finger thereon, whereby the assembled matrices are permitted to rise with the block without interference on the part of the resistant.

28. The vertically-movable assembling-block, the horizontal slide with its matrix-resisting finger, the weight and intermediate connections to retract the slide, and the dog to prevent retrograde motion, said elements combined substantially as shown.

29. In combination with the vertically-movable block or support for the aligned matrices, the horizontally-movable shifter having two arms between which the matrices are presented by the block.

30. The vertically-movable block channeled to admit of the matrices passing therethrough from one side to the other, in combination with mechanism located at a low level to deliver the matrices to the block and the horizontally-movable shifter located at a higher level to remove the assembled matrices from the block.

31. The shifter consisting of the arms $jj'$, secured to the slides and having solely a horizontal motion, whereby they are adapted to permit the introduction and removal of the matrix-line in a vertical direction.

32. The vertically-movable assembling-block, in combination with the horizontally-movable resistant, the horizontally-movable shifter having the spring-actuated arms, one of which engages the resistant, and the dog to hold the other arm, whereby the shifter is gradually opened, the aligned matrices delivered thereto, and the shifter closed upon the line preparatory to the shifting action.

33. The assembling-block grooved or channeled to receive the matrices and mounted to move vertically, in combination with the yielding resistant and retracting devices therefor, the dog to hold the resistant as it is advanced, and the lever adapted to raise and lower the composing-block and to disengage the dog, whereby the elevation of a completed line of matrices and the restoration of the detent to the position for starting a new line are secured by one operation.

34. In combination, the vertically-movable block in which the matrix-line is assembled, the horizontally-movable shifting device, the vertically-movable yoke to which the shifting device delivers the matrices, and the casting mechanism to which the matrices are lowered by the yoke.

35. In combination with the vertically-movable assembling-block, the horizontally-movable resistant $i$, to oppose the incoming matrices, the shifter having the horizontally and independently movable arms $j\ j'$, one of which engages the resistant, the spring tending to draw the shifter-arms together, and the latch to hold the arm $j'$ as its companion recedes during the assemblage of the matrices.

36. The horizontally-movable shifter consisting of the two arms and their independent sustaining-slides secured against vertical motion and the spring, substantially as shown, to approximate the arms.

37. In combination with the horizontally-sliding shifter J, the rock-shaft having its arm connected to the shifter, the second arm and its actuating-cam to advance the shifter, and the weight or its equivalent to retract the shifter.

38. The matrices having opposing shoulders at opposite ends, in combination with the supporting-yoke acting against the upper shoulders, the mold adapted to engage the lower shoulders, and mechanism, substantially as described, for moving the yoke to apply tensile strain to the matrices.

39. The combination of a series of matrices, a series of tapered space-bars, a support against which the matrices are seated and aligned, a pressure device to hold the matrices against said support, and an independent pressure device acting to move the space-bars in the same direction that the matrices are urged, whereby the action of the space-bars in justifying the line is prevented from disturbing the alignment of the matrices.

40. The matrices and the tapered space-bars, in combination with suitable supports to maintain the space-bars and matrices in line and two pressure devices acting in the same direction against the space-bars and matrices, respectively.

41. The mold having the groove or shoulder $n^4$ and the matrices having shoulders to engage therewith, in combination with matrix-lifting devices acting to force them endwise to a bearing in the groove, whereby their accurate alignment is secured.

42. In combination with the mold, the vertically-movable yoke to sustain the matrices in series and the vise opposing the mold and provided with the yielding face $m^2$ to sustain the yoke against the mold.

43. In combination with the vise or clamp and the matrix-sustaining yoke, the mold provided with the adjustable bearing $n^5$ to act against the yoke.

44. The mold-wheel and the melting-pot by which it is supplied with metal, in combination with the sliding plate located at one side of the pot and provided with a laterally-extending arm on which the mold-wheel is journaled.

45. In combination with the melting-pot to deliver metal to the mold, the mold and the stop-motion gear at opposite sides of the pot, the slide located at one side of the pot and having the lateral arm to sustain the mold-wheel, and the shaft mounted on said slide and geared at its opposite ends directly to the mold and to the driving-gear, respectively.

46. In combination with the vertically-movable yoke L, its actuating-lever provided with projection $l^{11}$ and roller $l^{12}$ and the actuating-wheel having projection $l^{10}$ and the peripheral cam-surface, as described.

47. In combination with a horizontal guide to deliver the line of matrices, a mold at a lower level, a distributing mechanism at a higher level, a series of matrices shouldered to engage the mold and resist upward motion, a vertically-movable yoke to sustain the matrices, and a yoke-operating lever and cam-wheel, the wheel shaped to present the yoke successively to the guide, the mold, and the distributer and to exert an upward pressure on the yoke while the matrices are engaged with the mold-wheel.

48. In a type-casting machine, a main frame and a mold sustained thereon, in combination with a melting-pot connected to the frame solely by long pivoted legs or arms, the latter having their points of attachment widely separated from the mold.

49. In a type-casting mechanism, a mold, a melting-pot from which the mold is supplied, a pump to effect the delivery of the metal into the mold under pressure, an exhaust-pipe communicating with the passage for the metal, and a valve closing the mouth of the exhaust-pipe, whereby the flow of the metal into the exhaust-pipe is prevented.

50. In a type-casting machine, a mold, a melting-pot having a mouth by which the mold is closed and through which the metal is delivered, a pump to deliver the metal, an exhaust-pipe communicating with the mold, a valve to close the mouth of the exhaust-pipe, and operating mechanism, substantially as shown, whereby the air-valve is closed during the action of the pump and opened when the pump-plunger is retracted.

51. In a type-casting mechanism, the combination of the mold, the melting-pot, the pump-piston to drive the metal from the pot into the mold, the exhaust-passage, the valve to close said passage, and the actuating-lever and its connections for closing the valve when the pump is operated.

52. In combination with the melting-pot having the isolated delivery-passage, the piston in said passage to expel the metal and the second piston acting to deliver the molten metal to the delivery-passage.

53. In combination with the melting-pot, the gas-pipe leading thereunder, the mercury-chamber through which the pipe communicates, and the second mercury-chamber connected to the first and mounted in or adjacent to the pot that the expansion of the mercury may bear due relation to the temperature of the pot.

54. In a type-casting mechanism, the melting-pot, the mercury-chamber through which the gas passes to heat the pot, the second mercury-chamber connected to the first and located in or upon the pot, and the adjustable screw or spindle to vary the level of the mercury.

55. The melting-pot mounted on pivoted legs, the pivoted arm $s^5$, and the intervening spring, in combination with the cam acting on arm $s^5$.

56. In combination with the main frame and the mold thereon, the vise provided with matrix-clamping devices and hinged to swing outward and locking devices to hold the vise in operative position.

57. In combination with the frame and the mold thereon, the hinged frame provided with matrix-sustaining clamps and with the slide for operating the justifying devices.

58. In combination with the main frame and the hinged vise, the screws threaded into the vise and having T-heads seated in slots in the frame.

59. In combination with the main frame and supports for the matrices and space-bars, a slide to actuate the space-bars, and a frame M to sustain said slide, hinged to the main frame to swing out of operative position, and locking devices to hold the same in place.

60. In combination with a mold and series of matrices, the vise-frame with the jaw $m^4$, the sliding jaw, its closing-spring, and the dog to hold it against the action of the spring.

61. In a matrix-clamping mechanism, the vise-frame, its two jaws, one of which is movable to and from the other, the spring to close the jaw, the dog to hold it open, the screw, and the nut on said screw to act against the movable jaw.

62. The mold, the matrices, and the vertically-movable yoke to sustain the matrices, in combination with the clamp having two jaws, the spring to close said jaws, the dog to hold them open, and the dog-releasing device actuated by the yoke, whereby the presentation of the matrices in front of the mold causes the action of the clamp to confine them.

63. In combination with the distributer-rail toothed to engage the matrices and permit their escape at different points in its length, a screw lying parallel therewith to advance the matrices thereover.

64. In combination with the toothed distributer-rail, two screws extended along its opposite sides, substantially as shown, whereby the matrices are advanced along the rail and permitted to descend therefrom between the screws.

65. In combination with the matrices and the space-bars having heads of greater width, the sustaining guide or channel $o'$, having the horizontal ledges or shoulders to sustain the matrices, and the oblique grooves $o^4$, to release the space-bars.

66. In combination with the matrices and the space-bars of greater width at the head, the guide or channel having horizontal shoulders to sustain the matrices, and grooves $o^4$, to discharge the space-bars, and the overlying rail, with teeth $o^5$, to prevent escape of the matrices.

67. In combination with horizontal supports for the matrix-line, the toothed distributer-rail thereover, the feed-screws lying beside the rail, and the lifter to present the successive matrices to the rail and screws.

68. The horizontal guide provided with top and bottom shoulders $o^6$ $o^7$ to engage and retain the matrices, in combination with the slide to urge the matrix-line forward and the lifter acting to carry the matrices upward one at a time out of engagement with the shoulders, whereby the matrices may be released by a slight movement instead of rising their entire length.

69. In a machine for casting linotypes from an assembled line of matrices, the combination of a mold, a series of matrices, and a matrix-clamp fitted to cover the mold in whole or in part, substantially as described, whereby the accidental escape of molten metal is prevented and blank surfaces produced on the linotype.

70. In a machine for casting linotypes from a line of matrices, a mold, mechanism for presenting a line of matrices against the mold to close the same, mechanism for supplying the mold with molten metal, and a covering device fitted to close the mold in the absence of the matrices.

71. In a machine for casting linotypes, the elongated mold, matrices adapted for arrangement in series to close the mold, and matrix-clamps adapted to fit against and cover the mold in the absence of the matrices.

72. The distributer-rail, the feed-screws, and the lifter-arm, in combination with the eccentric mounted on one of the screws, as shown.

73. In combination with the distributer-rail, the two feed-screws and the hinged supports for the forward screw.

74. The combination of a mold, a series of matrices and means for presenting the same to the mold, and a mold-closing device which is automatically opened when the matrix-line is advanced to the mold.

In testimony whereof I hereunto set my hand this 13th day of March, 1889, in the presence of two attesting witnesses.

OTTMAR MERGENTHALER.

Witnesses:
MURRAY HANSON,
WILLIAM H. BERRY.